United States Patent
Kaku et al.

(10) Patent No.: US 12,304,385 B2
(45) Date of Patent: May 20, 2025

(54) SEAT

(71) Applicant: TS TECH CO., LTD., Asaka (JP)

(72) Inventors: Hiroyuki Kaku, Tochigi (JP);
Ryuichiro Hirose, Tochigi (JP);
Hiroyuki Numajiri, Tochigi (JP);
Satoshi Fujita, Tochigi (JP); Takako Miyoshi, Tochigi (JP); Munetaka Kowa, Tochigi (JP); Atsushi Kusano, Tochigi (JP); Yoshikazu Ito, Tochigi (JP); Yousuke Higashi, Tochigi (JP); Satoshi Suzuki, Tochigi (JP); Ryosuke Sato, Tochigi (JP); Kento Uetake, Tochigi (JP); Yasuharu Otsuka, Tochigi (JP); Satoru Kaneda, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/601,363

(22) Filed: Mar. 11, 2024

(65) Prior Publication Data

US 2024/0208369 A1 Jun. 27, 2024

Related U.S. Application Data

(63) Continuation of application No. 17/046,262, filed as application No. PCT/JP2019/013945 on Mar. 29, 2019, now Pat. No. 11,958,385.

(30) Foreign Application Priority Data

Apr. 9, 2018 (JP) .................................. 2018-074636
Apr. 10, 2018 (JP) .................................. 2018-075487

(51) Int. Cl.
*B60Q 3/80* (2017.01)
*B60N 2/00* (2006.01)
(Continued)

(52) U.S. Cl.
CPC ............. *B60Q 3/80* (2017.02); *B60N 2/0029* (2023.08); *B60N 2/0034* (2023.08); *B60N 2/58* (2013.01);
(Continued)

(58) Field of Classification Search
CPC . B60Q 3/80; B60Q 3/70; B60Q 3/217; B60Q 1/544; B60Q 1/5035; B60Q 1/0023;
(Continued)

(56) References Cited

U.S. PATENT DOCUMENTS 6,450,678 B1 * 9/2002 Bayersdorfer ........... B60Q 3/51
362/581
7,162,344 B2 * 1/2007 Kojima ................ B60N 2/0033
701/45
(Continued)

FOREIGN PATENT DOCUMENTS

JP S59135759 U 9/1984
JP H11064131 3/1999
(Continued)

OTHER PUBLICATIONS

International Search Report and Written Opinion issued for International Patent Application No. PCT/JP2019/013945, Date of mailing: Jun. 18, 2019, 13 pages including English translation.

*Primary Examiner* — Syed A Islam
(74) *Attorney, Agent, or Firm* — HSML P.C.

(57) ABSTRACT

A seat includes a seat body and a sensor configured to acquired information on an occupant seated on the seat body. The seat includes a coating as a location marker that marks a location of the sensor to render the location visually recognizable from outside the seat body.

7 Claims, 23 Drawing Sheets

(51) Int. Cl.
  *B60N 2/58* (2006.01)
  *B60Q 1/00* (2006.01)
  *B60Q 1/26* (2006.01)
  *B60Q 1/50* (2006.01)
  *B60Q 3/217* (2017.01)
  *B60Q 3/70* (2017.01)
  *G01L 1/22* (2006.01)
  *G01P 13/00* (2006.01)

(52) U.S. Cl.
  CPC .......... *B60Q 1/0023* (2013.01); *B60Q 1/2611* (2013.01); *B60Q 1/50* (2013.01); *B60Q 1/5035* (2022.05); *B60Q 1/544* (2022.05); *B60Q 3/217* (2017.02); *B60Q 3/70* (2017.02); *G01L 1/22* (2013.01); *G01P 13/00* (2013.01); *B60N 2/0035* (2023.08); *B60N 2210/40* (2023.08); *B60N 2230/30* (2023.08)

(58) Field of Classification Search
  CPC ........... B60Q 1/2611; B60Q 1/50; G01L 1/22; G06R 13/00
  See application file for complete search history.

(56) References Cited

U.S. PATENT DOCUMENTS

| | | | |
|---|---|---|---|
| 8,493,082 | B2 | 7/2013 | Jeong |
| 9,953,538 | B1 | 4/2018 | Matthiesen et al. |
| 10,232,770 | B2 * | 3/2019 | LeCompte ............... B60Q 3/14 |
| 2011/0140723 | A1 | 6/2011 | Jeong |
| 2017/0066373 | A1 | 3/2017 | Lecompte et al. |

FOREIGN PATENT DOCUMENTS

| | | |
|---|---|---|
| JP | 2011121576 | 6/2011 |
| JP | 2017065504 | 4/2017 |
| JP | 2017196383 | 11/2017 |

* cited by examiner

PRESSURE

| CONDITIONS | IMITATIVE WORDS |
|---|---|
| $1.5 \leq TS/TS_n$ | fura-fura (tottering) |
| $1.2 \leq TS/TS_n < 1.5$ | nosshi-nosshi (lumping along) |
| $0.7 \leq TS/TS_n < 1.2$ | suta-suta (walking at brisk pace) |
| $TS/TS_n < 0.7$ | dota-dota (walking with heavy steps noisily) |

| NUMBER OF STEPS | EXERCISE LEVELS |
|---|---|
| ~60 | slow rambling |
| 61~110 | usual daily-life walking |
| 111~140 | exercise walking |
| 141~240 | jogging |
| 240~ | dashing |

SEAT

TECHNICAL FIELD

The present invention relates to a seat comprising a sensor to acquire information on an occupant seated on a seat body.

BACKGROUND ART

An apparatus with a pressure sensor or the like provided in a driver's seat to evaluate a posture of a seated occupant is hitherto known in the art (Patent document 1).

CITATION LIST

Patent Literature

Patent document 1: JP H11-064131 A

SUMMARY OF INVENTION

Hereupon, the known apparatus merely presenting the results of evaluation made on the posture of the seated driver disadvantageously does not appear to be utilized in its full potential. To utilize its full potential, for example, one approach may be conceivable which comprises presenting a driver with a proper seating posture and inviting the driver to make a motion so that the current seating posture of the driver is adjusted to assume the proper seating posture. However, on this occasion, if the driver is not informed of the positions of the sensors, disadvantageously, he/she would be at a loss how to move his/her own body.

Against this backdrop, the present invention has been made in an attempt to provide a seat which allows a driver to know the positions of sensors easily and utilize the sensors appropriately.

Another aspect of the present invention, which has been made in an attempt to seek for new added values, is intended to provide a feature of making a target device capable of being manipulated by a motion made on the seat and a capability of notifying another person that this feature is in use.

The present invention with which aforementioned disadvantages are to be addressed provides a seat comprising a seat body, and a sensor provided at the seat body and configured to acquire information on an occupant seated on the seat body.

The seat comprises a location marker that marks a location of the sensor to render the location visually recognizable from outside the seat body With this configuration, the location of the sensor can be visually recognized from outside the seat body with the help of the location marker; therefore, the occupant can easily become informed of the location of the sensor, and thus can utilize the sensor appropriately.

The seat body may comprise a cushion pad and an outer covering with which the cushion pad is covered, wherein the sensor may be disposed between the cushion pad and the outer covering.

The location marker may be exposed to view from outside the outer covering.

With this configuration, the exhibition made of the location marker to the outside of the outer covering can serve to make the location marker easily recognizable.

The location marker may have a color different from a color of the outer covering.

With this feature, the color of the location marker made different from that of the outer covering can serve to make the location marker easily recognizable.

The outer covering may have an opening in a position corresponding to the sensor, and the location marker may be exposed to view from outside the outer covering through the opening.

With this configuration, the exhibition made of the location marker to the outside of the outer covering through the opening can serve to make the location marker easily recognizable.

The location marker may be disposed between the outer covering and the sensor to make a part of the outer covering configured to protrude outward relative to other parts surrounding the part.

With this configuration, the protruding part of the outer covering outstanding relative to the surrounding parts allows an occupant to easily get informed of the location of the sensor.

The location marker may be a luminous member configured to emit light toward outside of the outer covering.

With this configuration, an occupant can easily get informed of the location of the sensor by the light.

The seat may further comprise a controller connected to the sensor and thereby allowed to acquire the information from the sensor, and connected to a target device outside the seat body and thereby allowed to communicate with the target device.

The location marker may be a luminous member configured to emit light toward outside of the outer covering, and the controller may be configured to cause the luminous member to emit light when communication with the target device has become available.

With this configuration, the luminous member is caused to emit light when the controller is able to communicate with the target device, that is, when a person to be seated may use the sensor; therefore, an unnecessary emission of light by the luminous member not in use can be restrained.

The controller may be configured to cause the luminous member to turn off when it has determined, based on information from the sensor, that an occupant has got seated.

With this configuration, the power consumption can be reduced in comparison with an alternative configuration in which the luminous member is caused to keep on emitting light even after the occupant has got seated.

The location marker may be the sensor.

This configuration obviates the necessity to provide any member other than the sensor for the location marker, and thus serves to reduce the costs.

The sensor may be configured to acquire, as the information, a measurement value for detecting motion of the occupant. In this embodiment, the controller may be capable of outputting an operation signal for operating the target device, based on the measurement value, and configured to output, to a notification device other than the target device, a notification signal for making notification that the target device is in use, when communication with the target device is available.

With this configuration, the controller may make the measurement value acquired from the sensor into a signal to be outputted to the target device for operating the target device; therefore, the occupant seated on the seat can operate the target device by doing a motion, such as moving an upper body, legs, etc., on the seat body.

Accordingly, the operation of the target device, which would conventionally require maneuver of the target device or the controller of the target device by hand, can be performed by means of the motion on the seat. For example, any person unwilling to use a hand, or even a person physically challenged and thus unable to use a hand, can also operate the target device by moving part of his/her body, or tensing part of his/her muscle or otherwise.

Moreover, as the notification signal for making notification that the target device is in use can be outputted to the notification device, it is possible to notify other person(s) that the target device is in use.

In the seat described above, the seat body may be provided in a vehicle. Herein, the notification device may be configured to notify anyone outside the vehicle that the target device is in use.

With this configuration, the occupant can share with the others outside the vehicle the information that the functionality of the seat is in use.

In this embodiment, the notification device may comprise a display disposed on an outer surface of the vehicle or in such a position within the vehicle as is recognizable from outside the vehicle.

The notification device may comprise a lighting part for the vehicle. Herein, the controller may output, as the notification signal, a signal for causing the lighting part to stay on or blink on and off.

The lighting part may be disposed on an upper edge of a door of the vehicle.

The notification device may comprise an electronic message board. Alternatively, the notification device may comprise an indicator light installed on top of a roof of the vehicle.

By making use of the electronic message board, or the indicator light on top of the roof, the notification that the target device is in use can be presented to the outside in an easy-to-recognize manner.

The notification device may comprise an information sharing server connected to terminals of a plurality of users via a network and configured to transmit received information to the terminals so that the information is shared among the plurality of users.

With this configuration, the information that the target device is in use can be shared among a plurality of persons via the network.

In this embodiment, the controller may be capable of acquiring location information from the seat body or the target device, and configured to output the notification signal with the location information included therein, to the information sharing server.

With this configuration, the server may transmit a signal indicative of information that the target device is in use, and the location information included therein, to the terminal of a user: thus, the location of the occupant can be indicated in a navigation system or a map app so that real-time information can be shared more timely.

In the seat described above, the notification device may be provided in the seat body.

In the seat described above, it is preferable that the sensor be located in a position that permits detection of a state of a seat surface facing an occupant seated on the seat body. It is also preferable that the sensor be capable of acquiring a value of pressure from an occupant seated on the seat body.

With these configurations, the occupant can operate the target device by changing the state of the seat surface; therefore, the operation of the target device can be performed with ease.

DESCRIPTION OF EMBODIMENTS

Next, a detailed description will be given of one embodiment of the present invention with reference made to accompanying drawings where appropriate.

Figure 1:
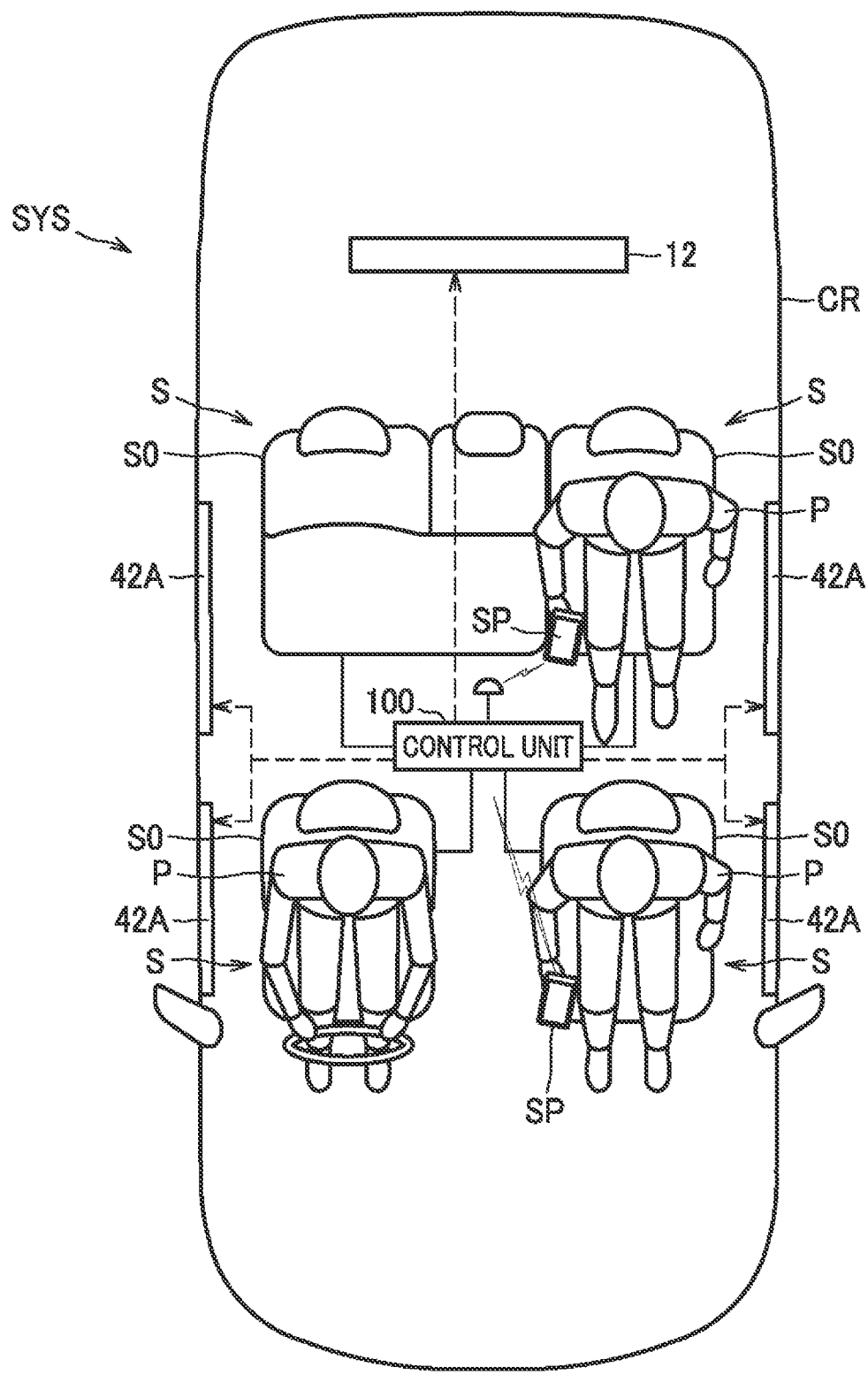
FIG. 1 is a diagram for explaining a general configuration of a system using vehicle seats according to one embodiment.

As shown in FIG. 1, a vehicle seat S in this embodiment is an example of a seat, and is configured as a car seat to be installed in a car CR by way of example. The vehicle seat S comprises a seat body S0 and a control unit 100. The car CR is provided with two front seats and two rear seats, each of these four seats being a vehicle seat S. Provided in the car CR is a control unit 100, as an example of a controller, which integrates pieces of information gathered from among the four vehicle seats S, causes them to operate in concert with one another, and communicates with a smartphone SP as an example of a target device.

To sum up, in the car CR, the control unit 100, a plurality of seat bodies S0 and smartphones SP constitute a system SYS for the vehicle seats S. It is to be understood that the smartphones SP for the respective occupants P and the corresponding seat bodies S0 are associated with each other, and such association has been established in advance through communications via the control unit 100.

The vehicle seat S in the present embodiment is configured to provide a 100-meter dash game on the smartphone SP that is a target device. The smartphone SP includes a display DSP (see FIG. 4), and the control unit 100 is configured to respond to an alternate up-and-down motion of left and right legs on the seat body S0, and generate a signal for operation causing a character to run a race in the game shown on the display DSP.

The control unit 100 is configured to be capable of outputting, to a notification device other than the smartphone SP, a notification signal for making notification that the smartphone SP is in use. The car CR is provided with a door light 42A and an electronic message board 12, as examples of a notification device. The door light 42A and the electronic message board 12 are connected with the control unit 100 by wire or by radio.

The door light 42A is an example of a lighting part and a display, and comprises an elongate LED (light-emitting diode) light, for example. The door light 42A is located, as shown in FIG. 2(a), at an edge of each side door 41 as an example of a door which edge borders on a side window 42. The door light 42A is provided, as shown in FIG. 3, on an upper edge of a door trim 21A which constitutes an interior of the side door 41. That is, the door light 42A can be seen not only from the outside of the car CR but also from the interior of the car CR.

The electronic message board 12 is located behind the rear seats within the car CR, in a position that makes it recognizable through a rear window 43 from outside the car CR, as shown in FIG. 1 and FIG. 2(b). The electronic message board is an example of a display.

Figure 4:
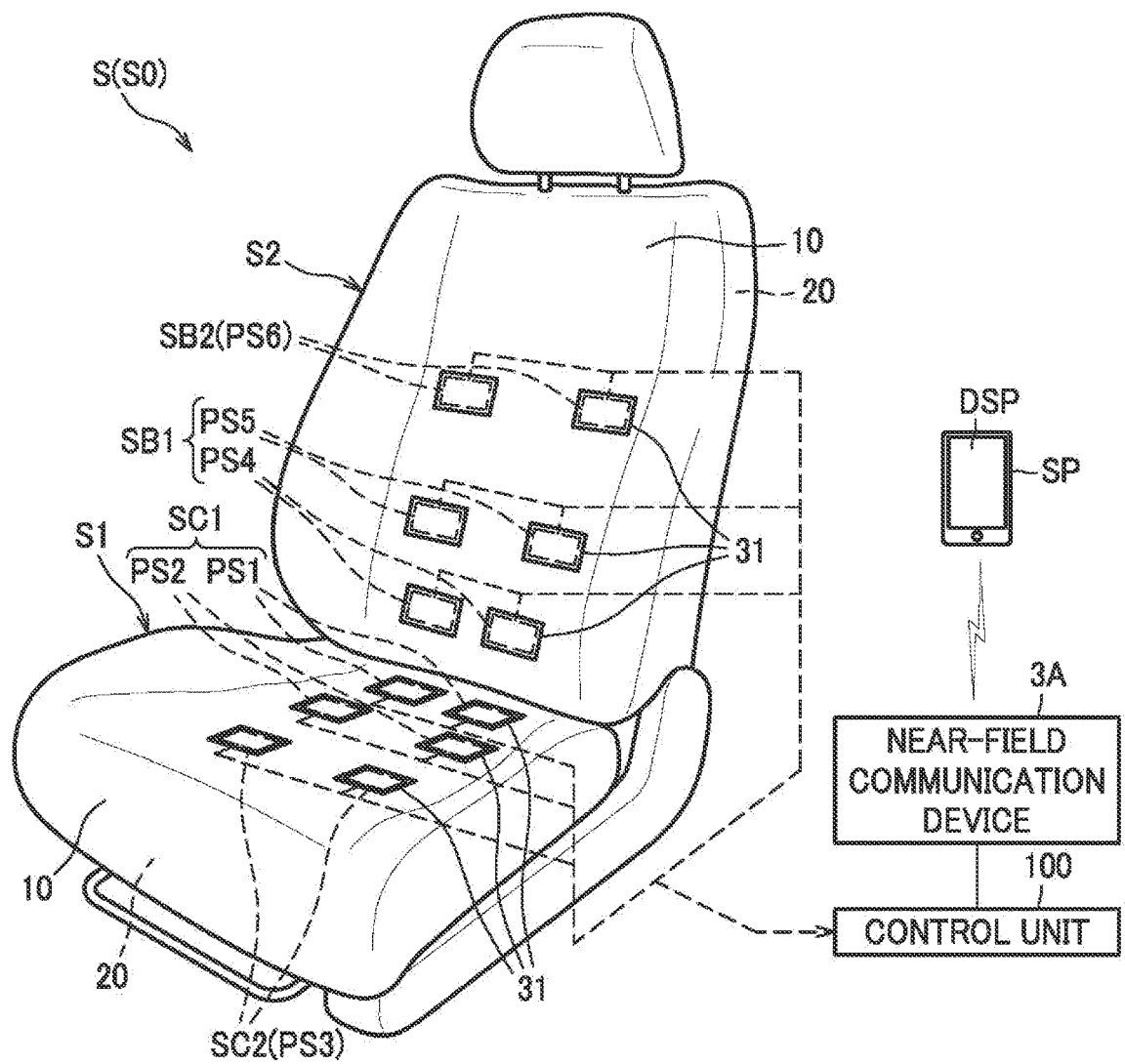
FIG. 4 is a diagram for explaining a configuration of a seat according to one embodiment.

As shown in FIG. 4, the seat body S0 comprises a seat cushion S1 and a seat back S2. The seat cushion S1 and the seat back S2 each comprise a cushion pad 20 and an outer covering 10 with which the cushion pad 20 is covered. The cushion pad 20 is made of urethane foam or the like, and supported by a frame (not shown). The outer covering 10 is made of synthetic leather, fabric or the like.

For the seat cushion S1 and the seat back S2, a plurality of pressure sensors PS1 to PS6 are provided under the outer coverings 10. The pressure sensors PS1 to PS6 are sensors configured to acquire information on an occupant seated on the seat body S0, and particularly in this embodiment, configured to acquire measurement values for use in identifying motion of an occupant P. The pressure sensors PS1 to PS6 are so located as to be allowed to detect a state of a seat surface that faces an occupant P seated on the seat body S0, to acquire values of pressure from the occupant P seated on the seat body S0.

The respective pressure sensors PS1 to PS6 are provided in pairs, each located left and right, symmetric with respect to a laterally central position of the vehicle seat S.

To be more specific, the seat cushion S1 has the pressure sensors PS1 to PS3 provided thereat. The pressure sensors PS1 and PS2 are provided in positions, corresponding to the buttocks of an occupant P, of the seat cushion S1. The pressure sensors PS1 and PS2 constitute a first cushion sensor SC1 that measures pressure from the buttocks of an occupant P. The pressure sensors PS2 are located a little frontward of the pressure sensors PS1. It is to be understood that the first cushion sensor SC1 may comprise only one of the pressure sensors PS1 and the pressure sensors PS2.

The pressure sensors PS3 are located under the thighs of an occupant P. The pressure sensors PS3 constitute a second cushion sensor SC2 that determines values of pressure from the thighs of the occupant P. The pressure sensors PS3 are located frontward of and distanced far from the pressure sensors PS1 and the pressure sensors PS2.

The seat back S2 has the pressure sensors PS4 to PS6 provided thereat. The pressure sensors PS4 are provided in positions corresponding to the back of the lumbar region of an occupant P. The pressure sensors PS5 are located a little above the pressure sensors PS4. Both of the pressure sensors PS4 and the pressure sensors PS5 constitute a first back sensor SB1 that measures pressure from the lumbar region of the occupant P. It is to be understood that the first back sensor SB1 may comprise only one of the pressure sensors PS4 and the pressure sensors PS5.

The pressure sensors PS6 are located above and distanced far from the pressure sensors PS4 and the pressure sensors PS5. The pressure sensors PS6 are located in positions corresponding to the upper region of the back of an occupant P. The pressure sensors PS6 constitute a second back sensor SB2 that determines values of pressure from the upper region of the back of the occupant P.

The pressure sensors PS1 to PS6 are each configured, for example, as an element whose electrical resistance varies with external pressure applied thereto, wherein the larger the pressure value, the higher (or the lower, as the case may be) the voltage of the detection signal becomes.

Figure 5:
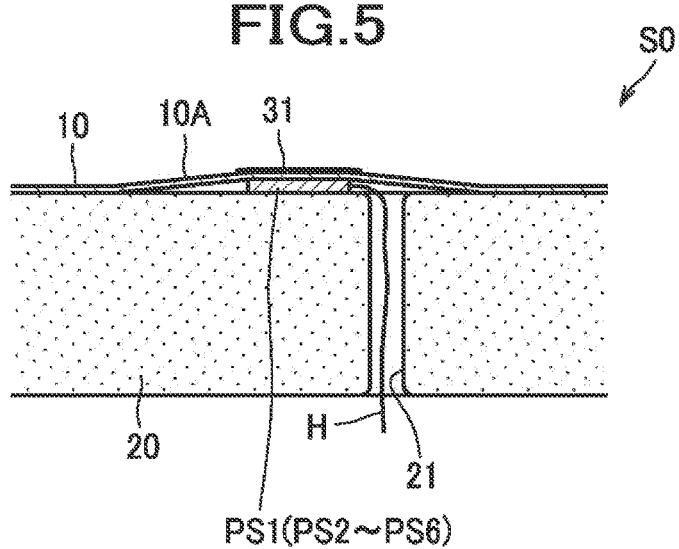
FIG. 5 is a section view showing a construction around a location marker.

As shown in FIG. 5, each of the pressure sensors PS1 to PS6 is disposed between the outer covering 10 and the cushion pad 20. Wiring H for each of the pressure sensors PS1 to PS6 is installed through a hole 21 formed in the cushion pad 20, and is connected to the control unit 100 (see FIG. 4).

A coating 31 as an example of a location marker is applied to an outer surface 10A of the outer covering 10, particularly in a position corresponding to each of the pressure sensors PS1 to PS6. The coating 31 is, by virtue of being applied to the outer surface 10A of the outer covering 10, exposed to view from outside the outer covering 10. The coating 31 has a color different from a color of the outer surface 10A of the outer covering 10. To be more specific, for example, in cases where the outer surface 10A of the outer covering 10 is black, the color of the coating 31 may be yellow or other colors which contrast well with the black color.

This coating 31 marks a location of each of the pressure sensors PS1 to PS6, as shown in FIG. 4, in such a way as to render the location visually recognizable from outside the seat body S0 by an occupant before getting seated on the vehicle seat S.

In the following description, pressure values acquired by the pressure sensors PS1 to PS6 are indicated by P1 to P6, respectively, and the pressure values of the right and left sensors are indicated with subscripts R and L, such as $P1_R$ and $P1_L$, respectively. The pressure sensors PS1 to PS6 are each configured, for example, as an element whose electrical resistance varies with external pressure applied thereto, wherein the larger the pressure value, the higher (or the lower, as the case may be) the voltage of the detection signal becomes. Accordingly, in practical applications, the magnitudes of the pressure values are compared in terms of the magnitude of the voltage values; however, for easy understanding, this specification is described as if determination is made based on the magnitude of the pressure values.

Figure 6:
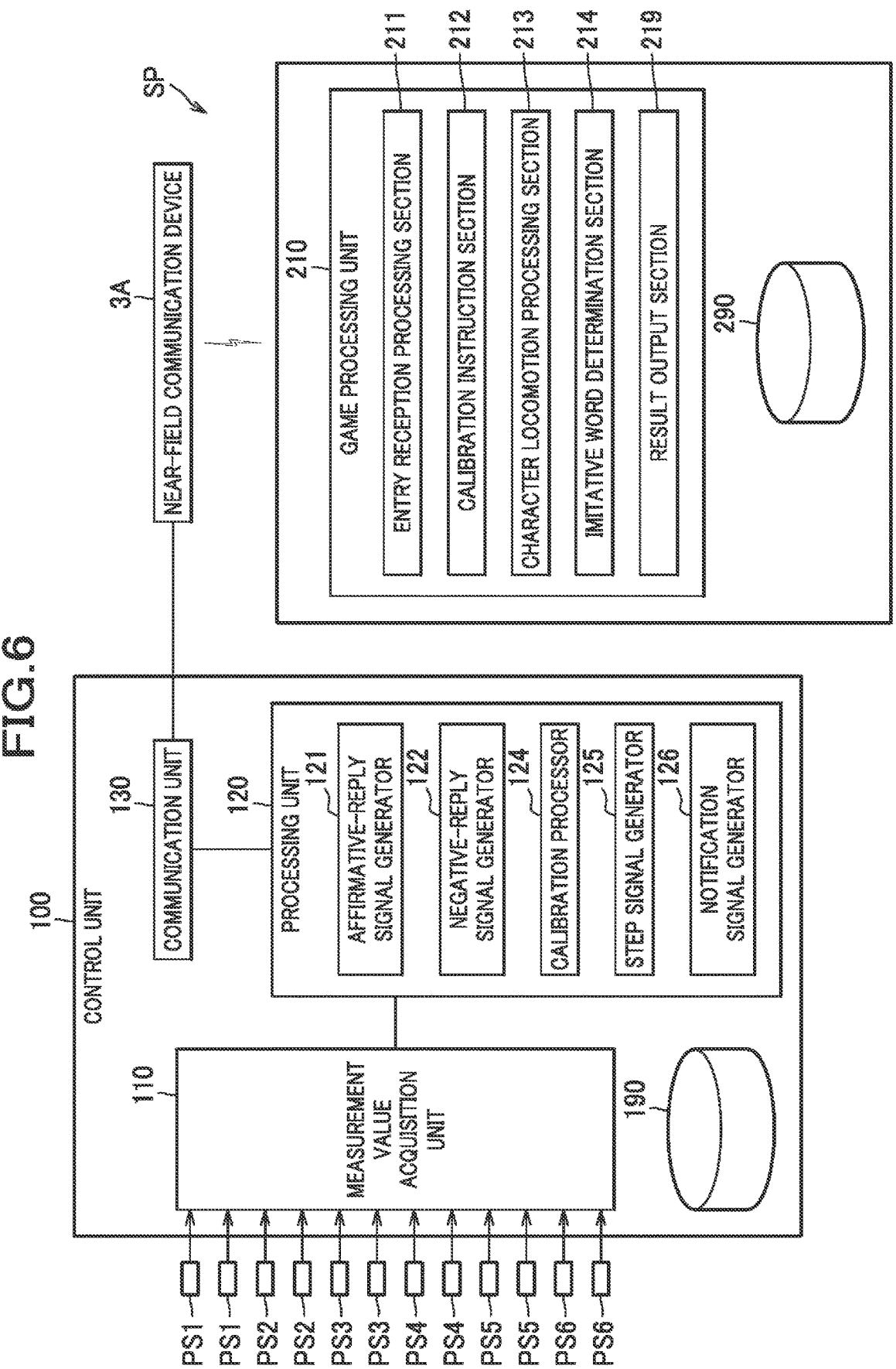
FIG. 6 is a block diagram for explaining a vehicle seat and system configuration.

As shown in FIG. 6, the control unit 100 comprises a measurement value acquisition unit 110, a processing unit 120, a communication unit 130, and a storage unit 190. The smartphone SP comprises a game processing unit 210 and a storage unit 290. The control unit 100 and the smartphone SP each include a CPU, ROM, a RAM, a rewritable non-volatile memory, etc. (not shown); each functional unit is implemented through execution of pre-stored programs.

The control unit 100 is connected to a near-field communication device 3A which enables near-field communication, such as Bluetooth (registered trademark), Wi-Fi (registered trademark), etc. The control unit 100 is capable of communicating with the smartphone SP via the communication unit 130 and the near-field communication device 3A, and configured to cooperate with apps (applications) installed in the smartphone SP to provide predetermined screens or voices/sounds to the smartphone SP, and allowed to acquire data entered via the smartphone SP.

The measurement value acquisition unit 110 has a function of acquiring measurement values of pressure per predetermined control cycle from the respective pressure sensors PS1 to PS6. The measurement values acquired by the measurement value acquisition unit 110 are stored in the storage unit 190 and used in the processing unit 120. The storage unit 190 is used to store data required for computation, processing, etc., on an as-appropriate basis.

The processing unit 120 communicates with the smartphone SP and executes a process of transmitting an operation signal for operating an app for the 100-meter dash game provided in the smartphone SP. The processing unit 120 also has a function of notifying anyone outside, by means of the door light 42A and the electronic message board 12, that the app for the 100-meter dash game on the smartphone SP is in use. The processing unit 120 comprises an affirmative-reply signal generator 121, a negative-reply signal generator 122, a calibration processor 124, a step signal generator 125, and a notification signal generator 126.

The processing unit 120 has operation modes which comprise a first operation mode in which an operation signal is outputted based on the measurement values of the pressure sensors PS1 to PS6, and a second operation mode in which the operation signal is not outputted. The processing unit 120 may be configured to operate in the first operation mode only after providing notification to prompt an occupant P to do a motion via the smartphone SP. To be more specific, as will be described later, after receipt of a signal indicative of reception of a variety of signals from the smartphone SP, the first operation mode is established to output an operation signal, while after receipt of a signal indicative of end of reception, the second operation mode is adopted in which no operation signal is outputted.

The affirmative-reply signal generator 121 and the negative-reply signal generator 122 output, to the smartphone SP, an affirmative-reply signal or a negative-reply signal as selected according to the motion of the occupant P, after the processing unit 120 receives an entry reception signal from the smartphone SP.

To be more specific, the affirmative-reply signal generator 121 outputs an affirmative-reply signal on condition that the pressure value $P6_R$ acquired from the right pressure sensor PS6 (first pressure sensor) exceeds a predetermined threshold value $P6th$. Similarly, the negative-reply signal generator 122 outputs a negative-reply signal on condition that the pressure value $P6_L$ acquired from the left pressure sensor PS6 (second pressure sensor) exceeds a predetermined threshold value $P6th$.

In the game processing unit 210 of the smartphone SP, a first operation of starting a game for the smartphone SP is assigned to the affirmative-reply signal, and a second operation of not playing the game is assigned to the negative-reply signal.

The calibration processor 124 acquires the pressure values $P3_R$, $P3_L$ from the right and left pressure sensors PS3, after the processing unit 120 receives a calibration start signal from the smartphone SP. Subsequently, the calibration processor 124 determines a normal pressure $P3_n$ that is an average pressure of an occupant P currently seated thereon and a threshold value $P3th$ for detection of peaks of pressure values, and computes and outputs to the smartphone SP a normal step cycle $TS_n$ that is an average of time intervals in each of which a sequence of motions of the legs of the occupant P is completed.

Figures 7, 8, 9:
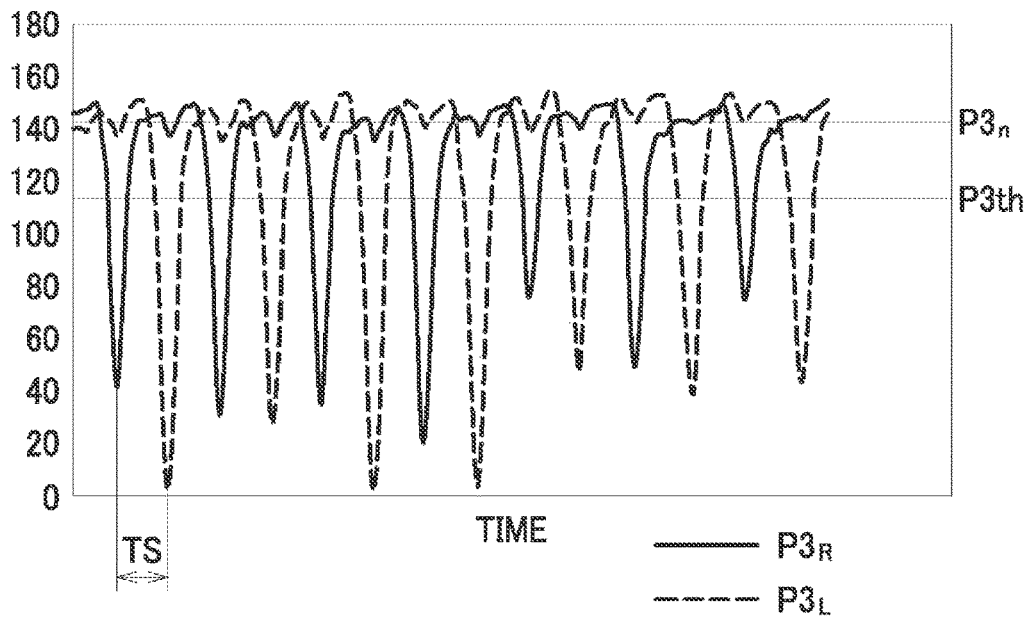
FIG. 7 is a graph showing change of pressure acquired at the time of calibration.
FIG. 8 is a table of criteria for determination of imitative or onomatopoeic words.
FIG. 9 is a table for determination of exercise levels.

To be more specific, when an occupant P lifts his/her legs alternately, the pressure values $P3_R$, $P3_L$ change as shown in FIG. 7, for example. In FIG. 7, a term in which the pressure goes down sharply indicates that the occupant P has lifted his/her leg up and the pressure at an area detected by the pressure sensor PS3 has become small accordingly. In fact, the pressure values that have not gone down but kept at about 140 will be reckoned as a normal pressure $P3_n$ that is an average of pressure values detected when the legs are not lifted up. To compute the normal pressure $P3_n$, for example, you may identify such absolute values as found not greater than a predetermined value (i.e., the values of which variations are small enough) among the absolute values of the differences between the last value and the present value of the pressure values $P3_R$, $P3_L$ (remainders each determined by subtraction of the last value $P3(n-1)$ from the present value $P3(n)$), and sum up and average the present values used to obtain the identified absolute values.

The threshold value $P3th$ is a threshold value for determining that the legs are currently being lifted up; for example, as is the case of FIG. 7, values ranging generally from 100 to 120 may be used. For this purpose, the threshold value $P3th$ may be a value obtained by multiplying the normal pressure $P3_1$ by a predetermined value. For example, the value obtained by multiplying the normal pressure $P3_1$ by a predetermined value ranging generally from 0.6 to 0.9 may be feasible for the threshold value $P3th$.

The normal step cycle $TS_n$ is an average value of the step cycle TS that is a time interval between peaks of the pressure values $P3_R$, $P3_L$.

Peak detection of the pressure values $P3_R$, $P3_L$ may be determined to occur when the difference between the last value and the present value changes from the negative to the positive under the condition that each pressure value $P3_R$, $P3_L$ is smaller than the threshold value P3*th* (i.e., pressure value has crossed the threshold value from above to below), and the last value P3($n$−1) detected at this last time is assumed to be a peak value Pm.

After the processing unit 120 receives a race start signal from a smartphone SP, the step signal generator 125 detects peaks of the pressure values $P3_R$, $P3_L$ varying according to the motions of an occupant P, and computes a peak value Pm. The detection of peaks and the computation of a peak value Pm may be executed in such a manner as executed by the calibration processor 124. The step signal generator 125 then computes a step intensity F ($F_R$, $F_L$) that is a leg-lift motion scale. The step intensity F may be indicated by the magnitude of the peak, i.e., a value obtained by subtraction of the peak value Pm from the normal pressure P3. In this embodiment, the obtained value is normalized by the normal pressure $P3_1$ so as to eliminate variations caused by largeness of the build of an occupant P. For example, the step intensity F may be given as follows:

$$F = (P3_n - Pm)/P3_n$$

The step signal generator 125 proceeds, upon detection of a peak of the pressure values $P3_R$, $P3_L$, to output the peak value Pm and the step intensity F to the smartphone SP. In this way, the step signal generator 125 outputs a signal based on the change in the pressure values P3 acquired from the pressure sensors PS3.

The notification signal generator 126 is configured to output, to the door light 42A and the electronic message board 12 as the notification devices, a notification signal for making notification that the smartphone SP is in use, when communication with the smartphone SP is available.

To be more specific, the notification signal generator 126 outputs a notification signal during a time period from receipt of a race start signal from a smartphone SP until receipt of a race end signal from the smartphone SP. It is to be understood that the notification signal generator 126 may be configured such that when at least one vehicle seat S satisfies the condition, a notification signal is outputted to all the door lights 42A, or may alternatively be configured such that when one vehicle seat S satisfies the condition, a notification signal is outputted only to a door light 42A of a side door 41 corresponding to the vehicle seat S. To the electronic message board 12, a notification signal is outputted when at least one vehicle seat S satisfies the condition.

The door light 42A is configured to come and stay on or blink on and off upon receipt of a notification signal.

Figure 2:
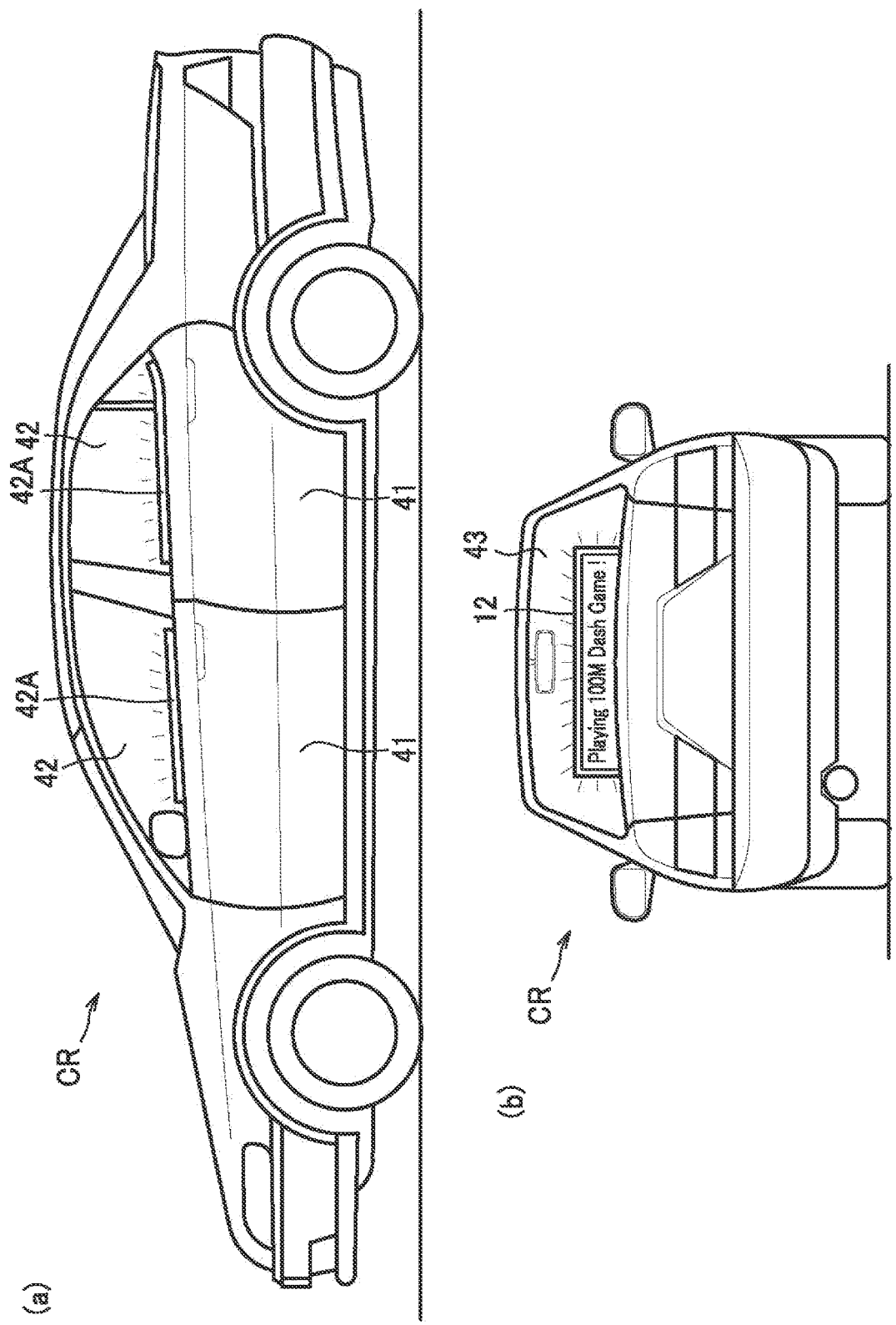
FIG. 2 includes (a) a side view of a car provided with a notification device, and (b) a rear view of the car.
Figure 3:
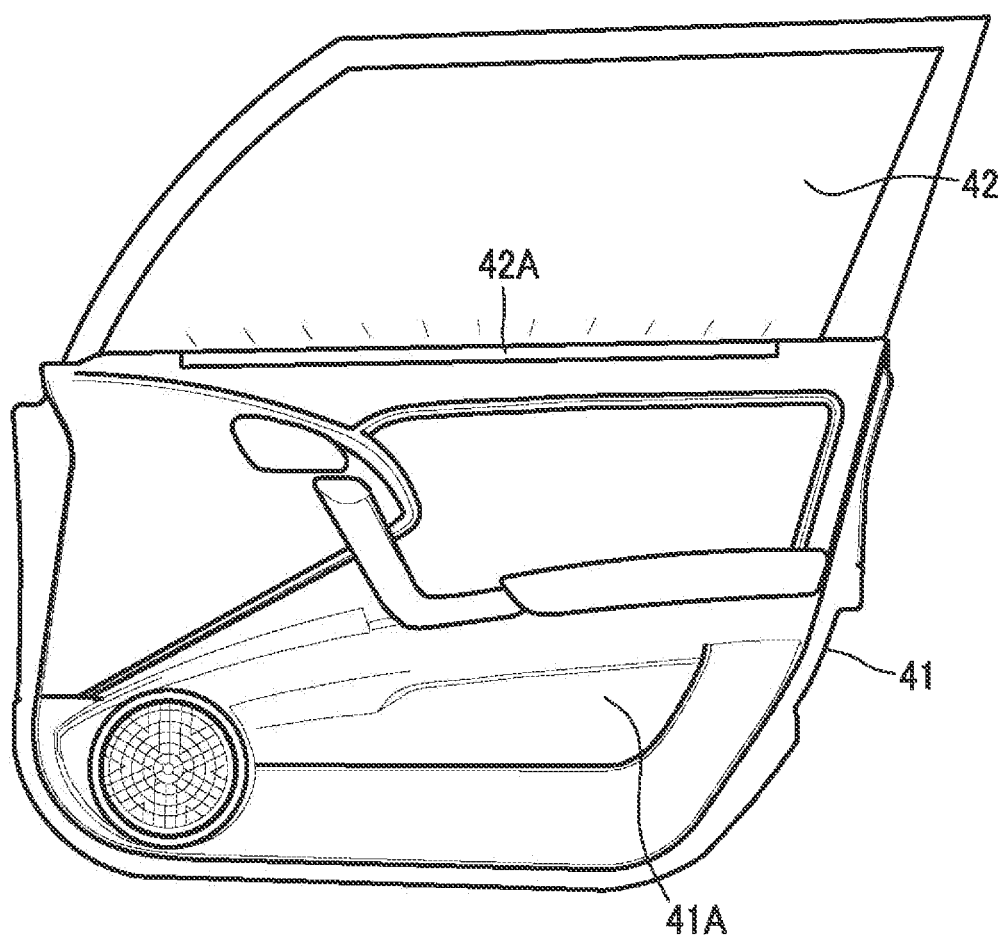
FIG. 3 is a diagram of door lighting provided at a door trim as viewed from an interior of a car.

The electronic message board 12 shows a text message that the 100-meter dash game app is in use, such as "Playing 100M Dash Game!", as shown in FIG. 2 (*b*), upon receipt of a notification signal.

On the other hand, the game processing unit 210 of the smartphone SP executes, upon startup of an application (app), a game proceeding process. The game processing unit 210 comprises an entry reception processing section 211, a calibration instruction section 212, a character locomotion processing section 213, an imitative word determination section 214, and a result output section 219. The game processing unit 210 stores signals received from the control unit 100 together with times of receipt in the storage unit 290. The storage unit 290 is used, where deemed appropriate, to store data necessary for computation, processing, etc. Moreover, the game processing unit 210 is configured to transmit data such as traveled distances L as computed, results of exercises, etc. to the control unit 100, where appropriate, to share the data with smartphones SP associated with other vehicle seats S. The control unit 100 accumulates these data in the storage unit 190.

Figure 16:
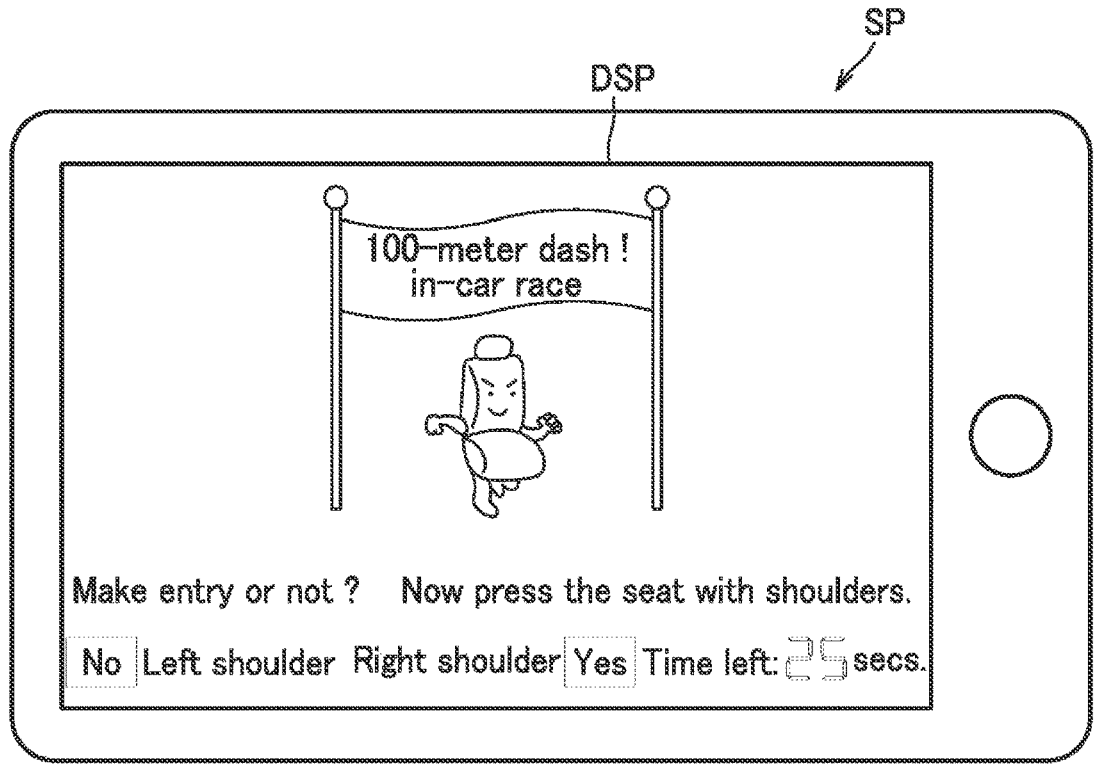
FIG. 16 is an example of a start screen.

The entry reception processing section 211 shows a start screen for reception of entry on the display DSP, transmits an entry reception signal to the control unit 100, and waits to receive an affirmative-reply signal or a negative-reply signal from the control unit 100 for a predetermined period of time. The start screen displays a notification for prompting the occupant P to do a motion, for example, as shown in FIG. 16, which includes texts such as "Make entry or not? Now press the seat with shoulders", and representations of "No, left shoulder, right shoulder, Yes". It is to be understood that the representations of Yes and No may each have a function as a button for furnishing the smartphone SP with the affirmative-reply signal or the negative-reply signal that can be generated with a touch of the display DSP. The entry reception processing section 211 proceeds, upon receipt of the affirmative-reply signal, to execute a game proceeding process, and proceeds, upon receipt of the negative-reply signal, to bring the app to an end without executing the game proceeding process. If the predetermined period of time has elapsed without receiving the affirmative-reply signal or the negative-reply signal, the game processing unit 210 then transmits a reception close signal to the control unit 100, and brings the app to an end.

The calibration instruction section 212 shows a calibration screen, and transmits a calibration start signal to the control unit 100, and waits to receive signals related to calibration from the control unit 100 for a predetermined period of time. Alter a lapse of the predetermined period of time, the calibration instruction section 212 outputs a calibration end signal to the control unit 100.

The character locomotion processing section 213 operates during a 100-meter race, and upon receipt of a step intensity F causes a character on the display DSP to move toward the finish line. The amount of locomotion in this operation is determined in accordance with the magnitude of the step intensity F. The character locomotion processing section 213 may, for example, cause the character to move for a distance F [m] toward the finish line.

The imitative word determination section 214 operates during a 100-meter race, and determines, and outputs on the display DSP, an imitative word that expresses a way how an occupant P is running (onomatopée or mimetic representation such as "Yochi-yochi (it looks as if toddling)"). Determination of the imitative word may be made, for example, based upon the step cycle TS that is a time interval at which the occupant P is moving his/her legs by comparison with the determination conditions shown in FIG. 8. The step cycle TS is the time interval of the step intensity F received from the control unit 100; however, as the time interval at which the step intensity F is received is not regular, an average time interval for the past 20 m can be adopted for computation.

In the present embodiment, for the purpose of reducing the effect of variations among individual occupants P, the determination of the imitative word expression is made by comparing, with a threshold value, a value given by division of the step cycle TS by the normal step cycle $TS_n$. For example, $TS/TS_n$ not smaller than 1.5, which means that the cycle is long, is assigned to "fura-fura (tottering)"; $TS/TS_n$ not smaller than 1.2 and smaller than 1.5 to "nosshi-nosshi (lumping along)"; $TS/TS_n$ not smaller than 0.7 and smaller than 1.2 to "suta-suta (walking at brisk pace)"; $TS/TS_n$ smaller than 0.7 to "dota-dota (walking with heavy steps noisily)", etc.

The result output section 219 operates after an occupant P finishes in a 100-meter dash game, and determines, and outputs on the display DSP, the result of exercise and recommendations. In addition, the result of exercise is transmitted to the control unit 100.

To be more specific, the result output section 219 determines, as the result of exercise, an exercise level, a quantity of exercise, an exercise intensity, and a recommendation.

The exercise level is determined by performing a lookup in the exercise level determination table of FIG. 9 based on the number of steps taken during a 100-meter race. For example, the exercise level determination table lists predefined items such as "slow rambling" assigned to the number of steps not greater than 60, "usual daily-life walking" to the number of steps ranging from 61 to 110, "exercise walking" to the number of steps ranging from 111 to 140, "jogging" to the number of steps ranging from 141 to 240, and "dashing" to the number of steps not smaller than 240, etc.

The quantity of exercise may be determined for example by computing a cumulative value of step intensities F measured during a 100-meter race.

The exercise intensity is represented by METs (metabolic equivalents). The value of the exercise intensity may be determined for example by multiplying the number of steps taken during a 100-meter race by a predetermined coefficient.

The recommendation may be determined by performing a lookup in the recommendation table stored beforehand in the storage unit 290. The recommendation table may be formulated for example with predetermined recommendations associated with parameters such as the numbers of steps, record times for a 100-meter race, average step cycles, etc. The recommendations can be determined by performing a lookup with these parameters obtained after finishing in the 100-meter race.

After making a determination of the exercise level, the quantity of exercise, the exercise intensity and the recommendation, the result output section 219 shows these results on the display DSP.

Next, a description will be given of an example of processes of the control unit 100 and the app, as well as other processes of the game processing unit 210, with reference to the flowcharts.

To begin with, the process of the control unit 100 will be described below.

Processes of FIG. 10 to FIG. 13 are executed repeatedly.

Figure 10:
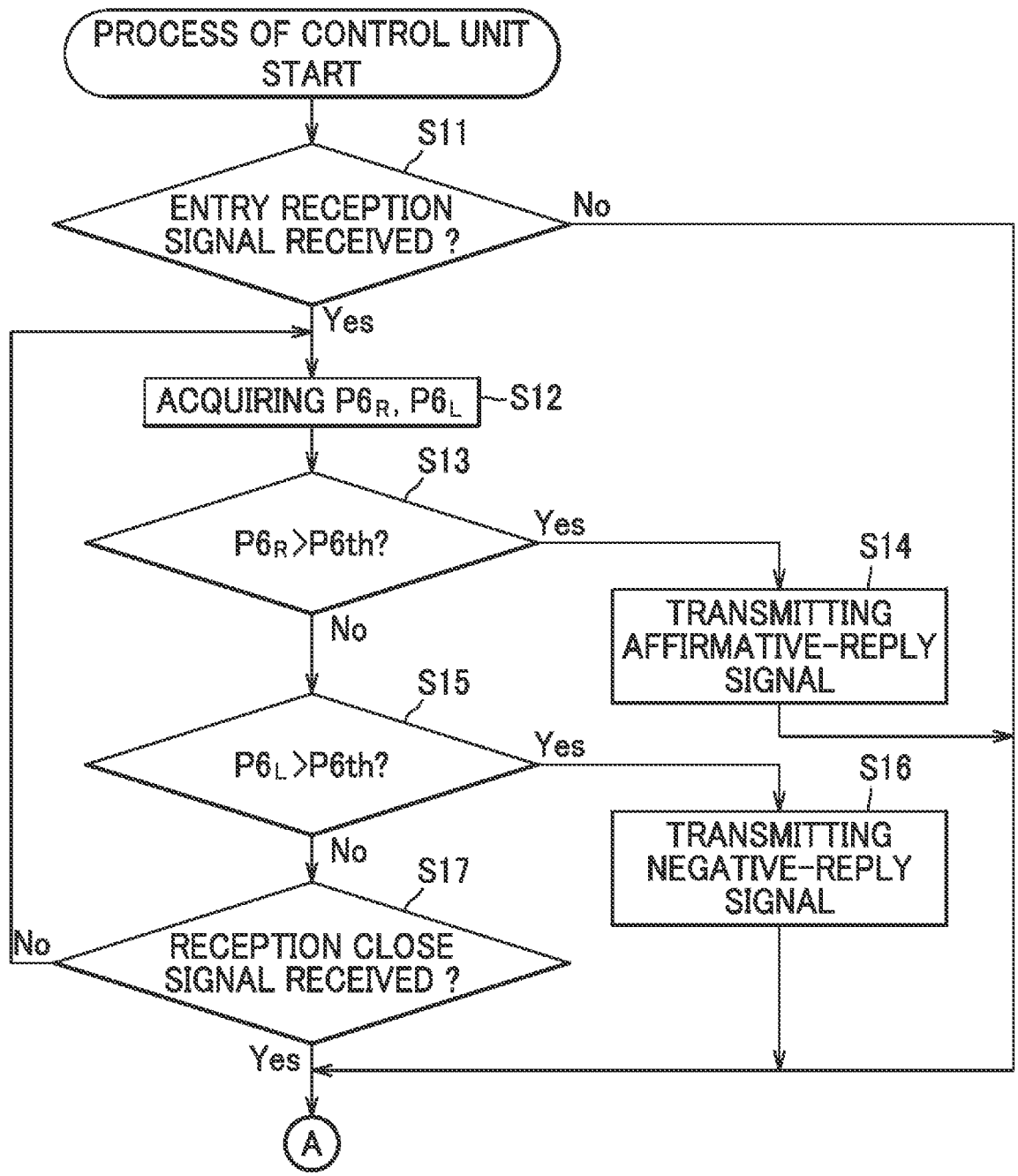
FIG. 10 is a flowchart of an example of the process of a control unit, showing a subset of steps for processing entry into a game.

As shown in FIG. 10, the processing unit 120, at the outset, executes steps S11 to S17 related to the entry into the game. To be more specific, first, a determination is made as to whether or not an entry reception signal has been received (S11).

If it is determined that an entry reception signal has been received (Yes, S11), the processing unit 120 then acquires pressure values $P6_R$, $P6_L$ (S12), and makes a determination as to whether or not the right pressure value $P6_R$ is greater than the threshold value $P6th$ (S13). If $P6_R$ is greater than $P6th$ (Yes, S13), then an affirmative-reply signal is transmitted (S14), and the process related to the entry into the game is brought to an end.

If $P6_R$ is not greater than $P6th$ (No, S13), the processing unit 120 then makes a determination as to whether or not the left pressure value $P6_L$ is greater than $P6th$ (S15). If $P6_L$ is greater than $P6th$ (Yes, S15), then a negative-reply signal is transmitted (S16), and the process related to the entry into the game is brought to an end.

If $P6_L$ is not greater than $P6th$ (No, S15), the processing unit 120 then makes a determination as to whether or not a reception close signal has been received (S17), and if not received (No, S17), then the process starting from step S12 is repeated, while if received (Yes, S17), then the process related to the entry into the game is brought to an end.

Figure 11:
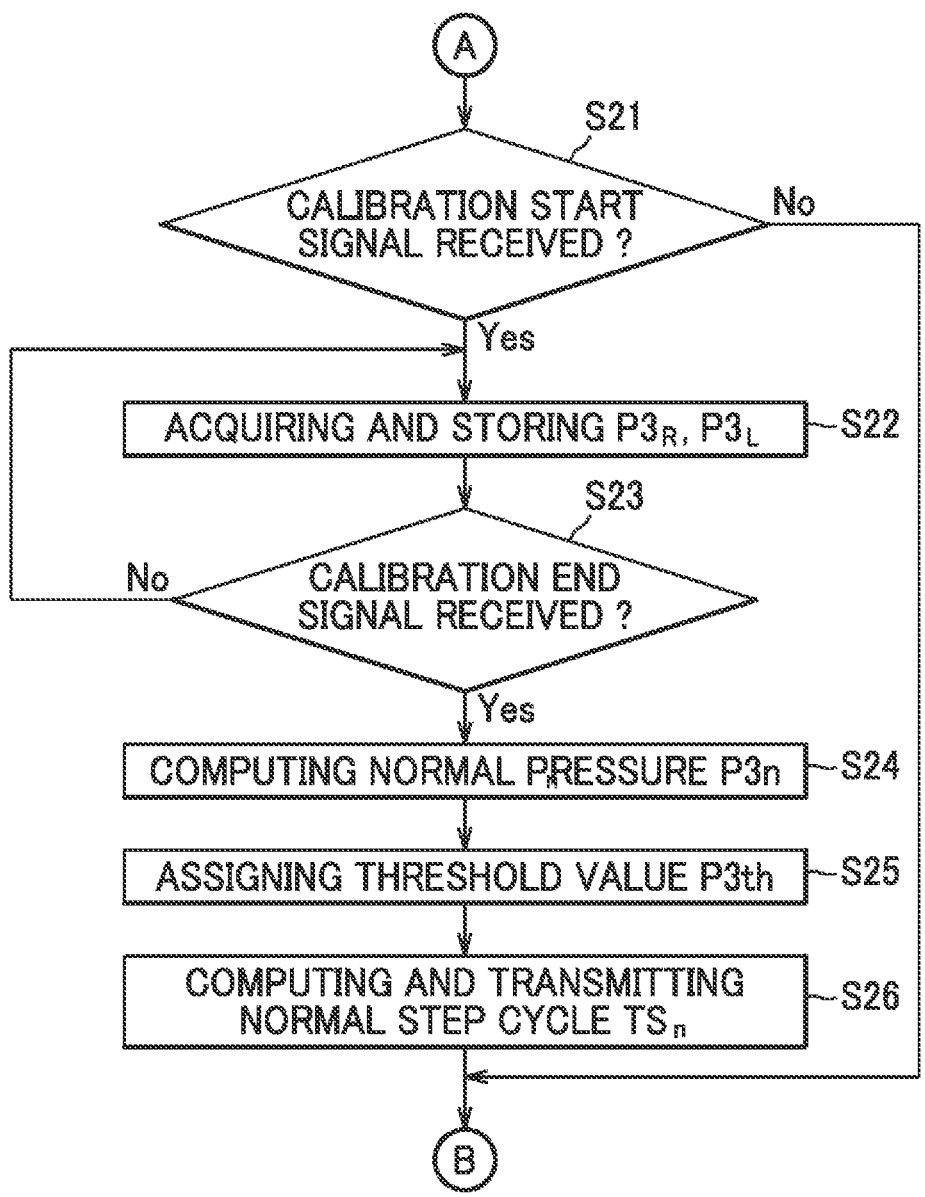
FIG. 11 is a flowchart of an example of the process of the control unit, showing a subset of steps for calibration.

After the process related to the entry into the game comes to an end, the calibration processor 124 of the processing unit 120 executes steps S21 to S26 related to the calibration process, as shown in FIG. 11.

The processing unit 120 makes a determination as to whether or not a calibration start signal has been received (S21), and if received (Yes, S21), then acquires and stores pressure values $P3_R$, $P3_L$ (S22). Subsequently, a determination is made as to whether or not a calibration end signal has been received, and steps S22 to S23 are repeated until after receipt of that signal, i.e., as long as no such signal is received (No, S23), while once the signal is received (Yes, S23), then the process goes to step S24.

In step S24, the calibration processor 124 computes a normal pressure $P3_n$ based upon the pressure values $P3_R$, $P3_L$ acquired and stored during a predetermined period of time. Then, a threshold value $P3th$ is set based upon the normal pressure $P3_n$ (S25). In addition, a normal step cycle $TS_n$ is computed, and transmitted to the smartphone SP (S26).

In step S21, if the calibration start signal has not been received (No), then the calibration processor 124 proceeds to step S30 (see FIG. 12) without executing the calibration process.

Next, the processing unit 120 executes a process of steps S30 to S40 related to a race.

Figure 12:
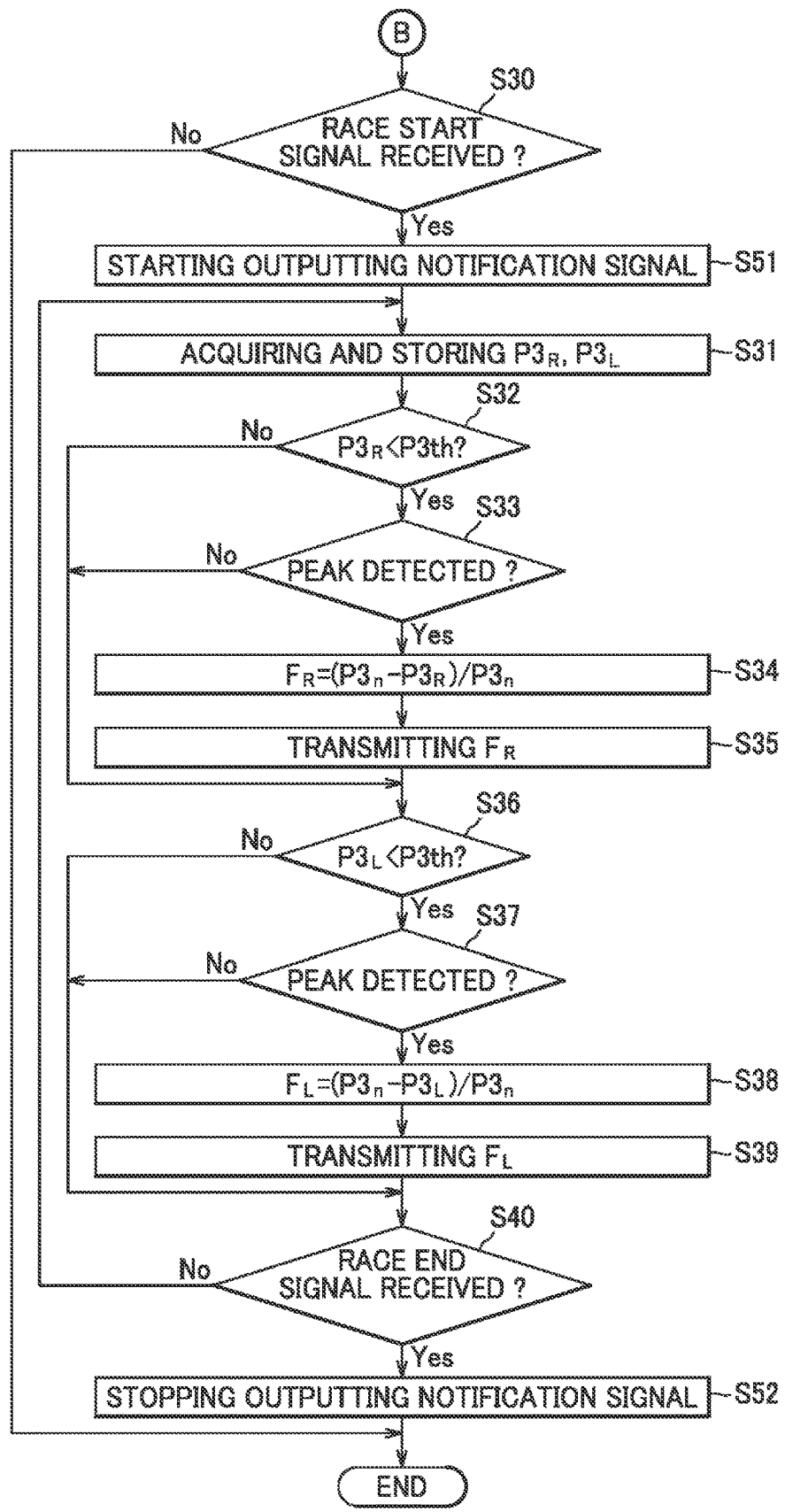
FIG. 12 is a flowchart of an example of the process of the control unit, showing a subset of steps for processing a race.

As shown in FIG. 12, first, the processing unit 120 makes a determination as to whether or not a race start signal has been received from the smartphone SP (S30). If the race start signal has not been received (No, S30), then the processing unit 120 brings the process to an end. If the race start signal has been received (Yes, S30), the notification signal generator 126 then starts outputting a notification signal (S51). Next, the step signal generator 125 acquires and stores the pressure values $P3_R$, $P3_L$ (S31).

Subsequently, a determination is made as to whether or not the right pressure value $P3_R$ is smaller than the threshold value $P3th$ (S32), and if smaller (Yes, S32), then a determination is made as to whether or not a peak has been detected from the last value and the present value of the pressure values $P3_R$ (S33). If a peak has been detected (Yes, S33), then the step signal generator 125 computes a step intensity $F_R$ from the normal pressure $P3_n$ and the pressure value $P3_R$ (S34). The step intensity $F_R$ thus computed is transmitted to the smartphone SP (S35).

On the other hand, if the right pressure value $P3_R$ is not smaller than the threshold value $P3th$ (No, S32), or no peak has been detected (No, S33), then the step signal generator 125 proceeds to step S36 without computing and transmitting the step intensity $F_R$.

In steps S36 to S39, the step signal generator 125 executes the processes of detecting a peak, and computing and transmitting a step intensity $F_L$ for the left pressure values $P3_L$. As these processes are similar to those of steps S31 to S35, a description thereof will be omitted.

In step S40, the processing unit 120 makes a determination as to whether or not a race end signal has been received, and if not received (No, S40), then the process starting from step S31 is repeated, while if received (Yes, S40), then the notification signal generator 126 stops outputting a notification signal (S52), and the process is brought to an end.

Next, a description of a process of the app (game processing unit 210) of the smartphone SP will be given below.

Figure 13:
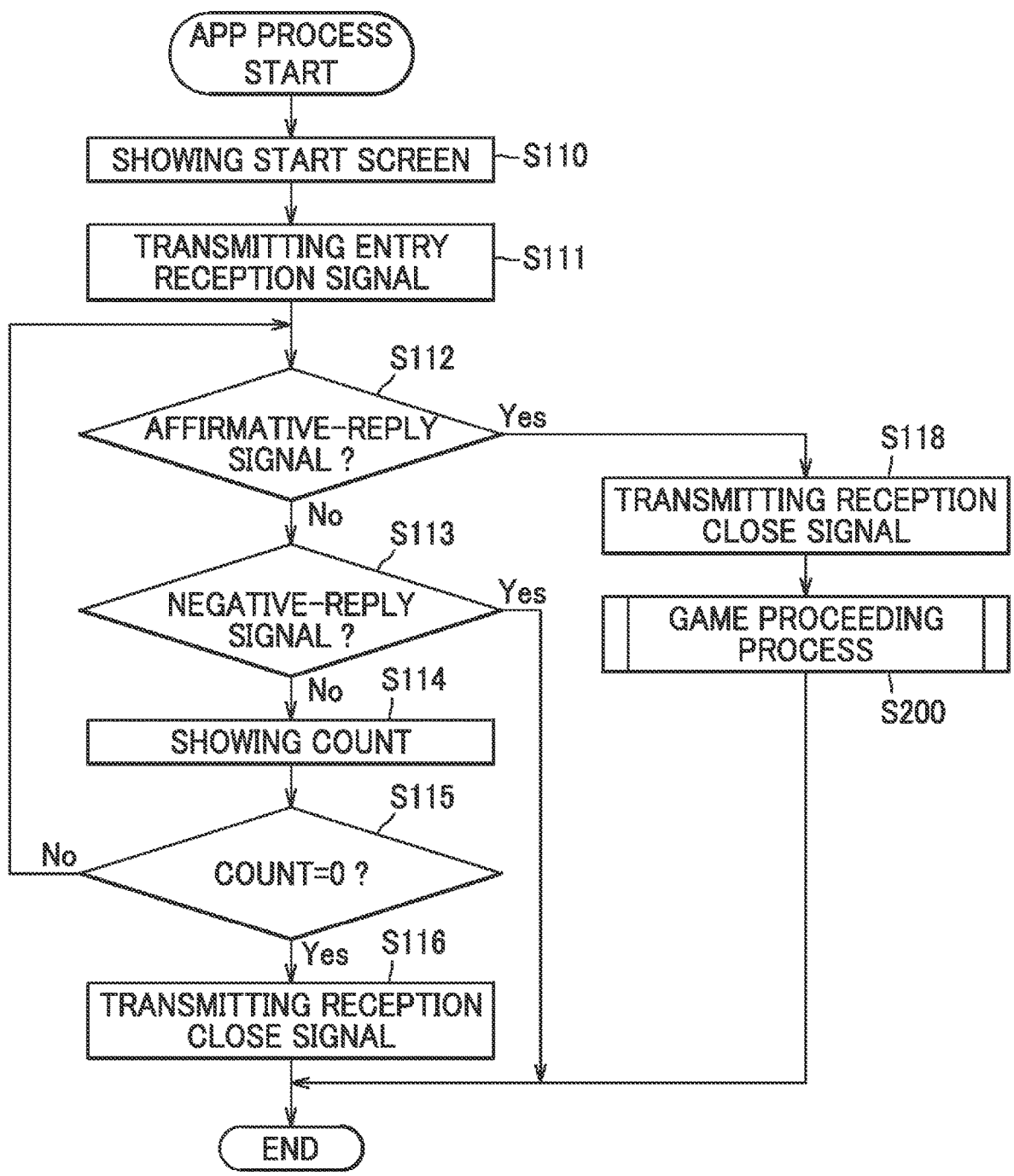
FIG. 13 is a flowchart of an example of the process of an app.

When an app (application) is activated, the smartphone SP starts the process of the app, and shows a start screen on the display DSP (S110) as shown in FIG. 13. The start screen is, for example, a screen as shown in FIG. 16. In the start screen, the text "Make entry or not ? Now press the seat with shoulders" and an instruction showing that the left shoulder action stands for negative reply (equivalent to saying 'No') and the right shoulder action stands for affirmative reply (equivalent to saying 'Yes') are displayed. In addition, the remaining time to make a reply for obtaining entry is shown.

The entry reception processing section 211 transmits an entry reception signal to the control unit 100 (S111). The entry reception processing section 211 makes a determination as to whether or not an affirmative-reply signal has been received (S112), and if received, (Yes, S112), then transmits a reception close signal to the control unit 100 (S118), proceeds to execute a game proceeding process (S200), and eventually brings the process to an end. The game proceeding process will be described later.

If the affirmative-reply signal has not been received (No, S112), then the entry reception processing section 211 makes a determination as to whether or not a negative-reply signal has been received (S113), and if received (Yes, S113), then brings the process to an end.

On the other hand, if the negative-reply signal has not been received (No, S113), then the entry reception processing section 211 shows a count indicative of the remaining time (S114) and makes a determination as to whether or not the count has reached zero (S115). If the count has not reached zero (No, S115), then the process of entry reception as proceeding from step S112 is continued, while if the count has reached zero (Yes, S115), then a reception close signal is transmitted to the control unit 100 (S116), and the process is brought to an end.

Figure 14:
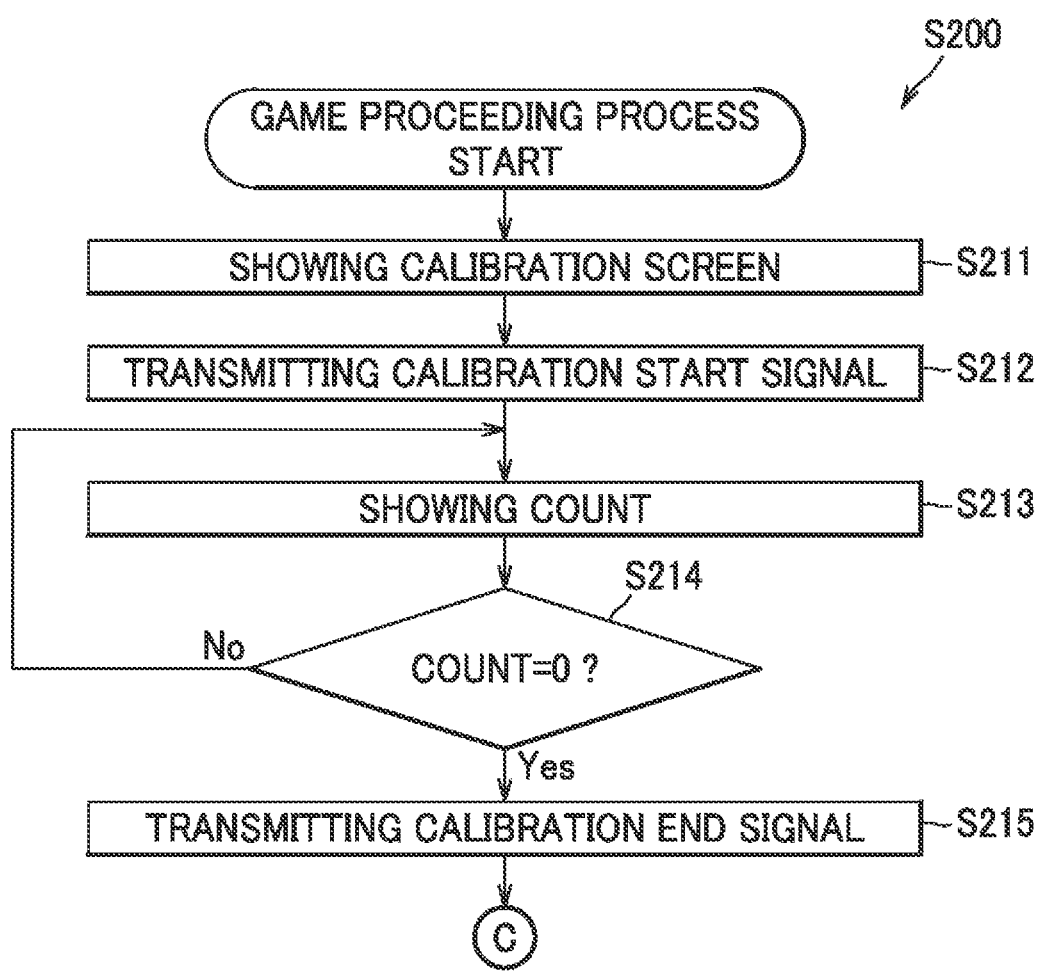
FIG. 14 shows a subset of steps for calibration in a game proceeding process.
Figure 17:
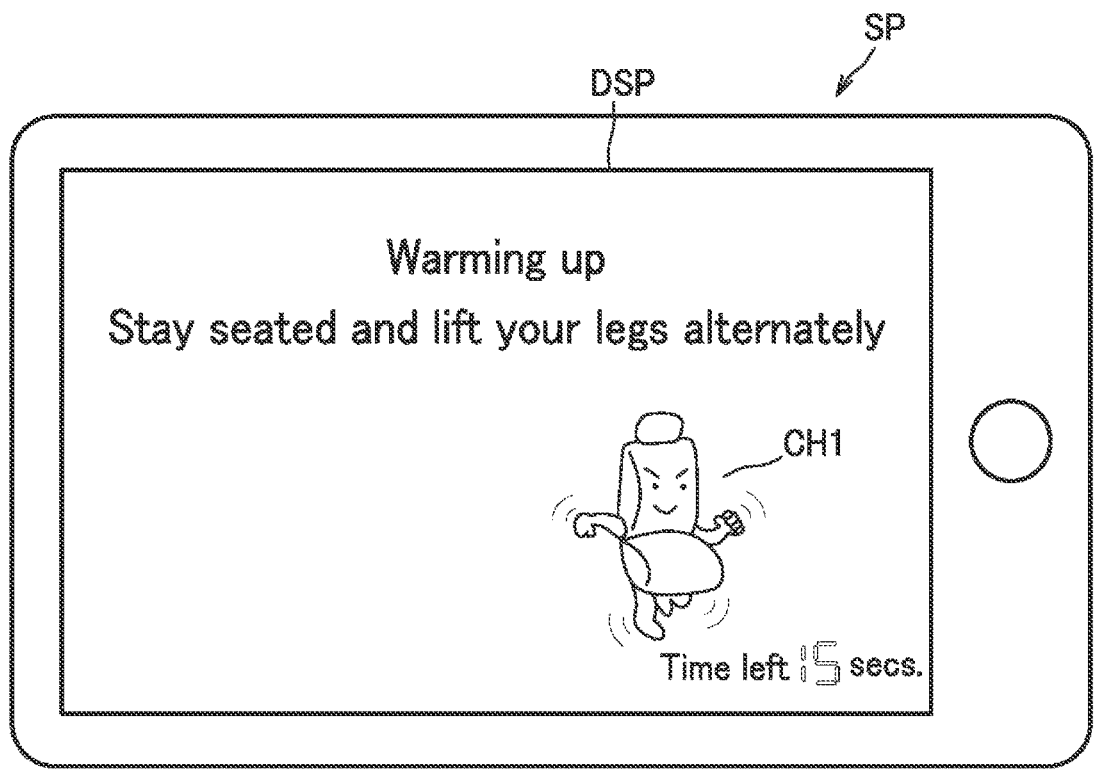
FIG. 17 is an example of a warm-up screen.

As shown in FIG. 14, in the game proceeding process (S200), first, the calibration instruction section 212 shows a calibration screen on the display DSP (S211). The calibration screen displays, for example, as shown in FIG. 17, an instruction in text format "Warming up, stay seated and lift your legs alternately" and the remaining time for calibration. An animated cartoon of a running character CH1, such as a personified seat, may be shown on the display DSP to help an occupant P to easily understand what to do.

Subsequently, the calibration instruction section 212 transmits a calibration start signal to the control unit 100 (S212). Then, the updated count of the remaining time is shown on the display DSP (S213), and a determination is made as to whether the count has reached zero (S214). If the count has not reached zero (No, S214), then the showing of the decrementing count in step S213 continues; if the count has reached zero (Yes, S214), then the calibration end signal is transmitted to the control unit 100 (S215).

Figure 15:
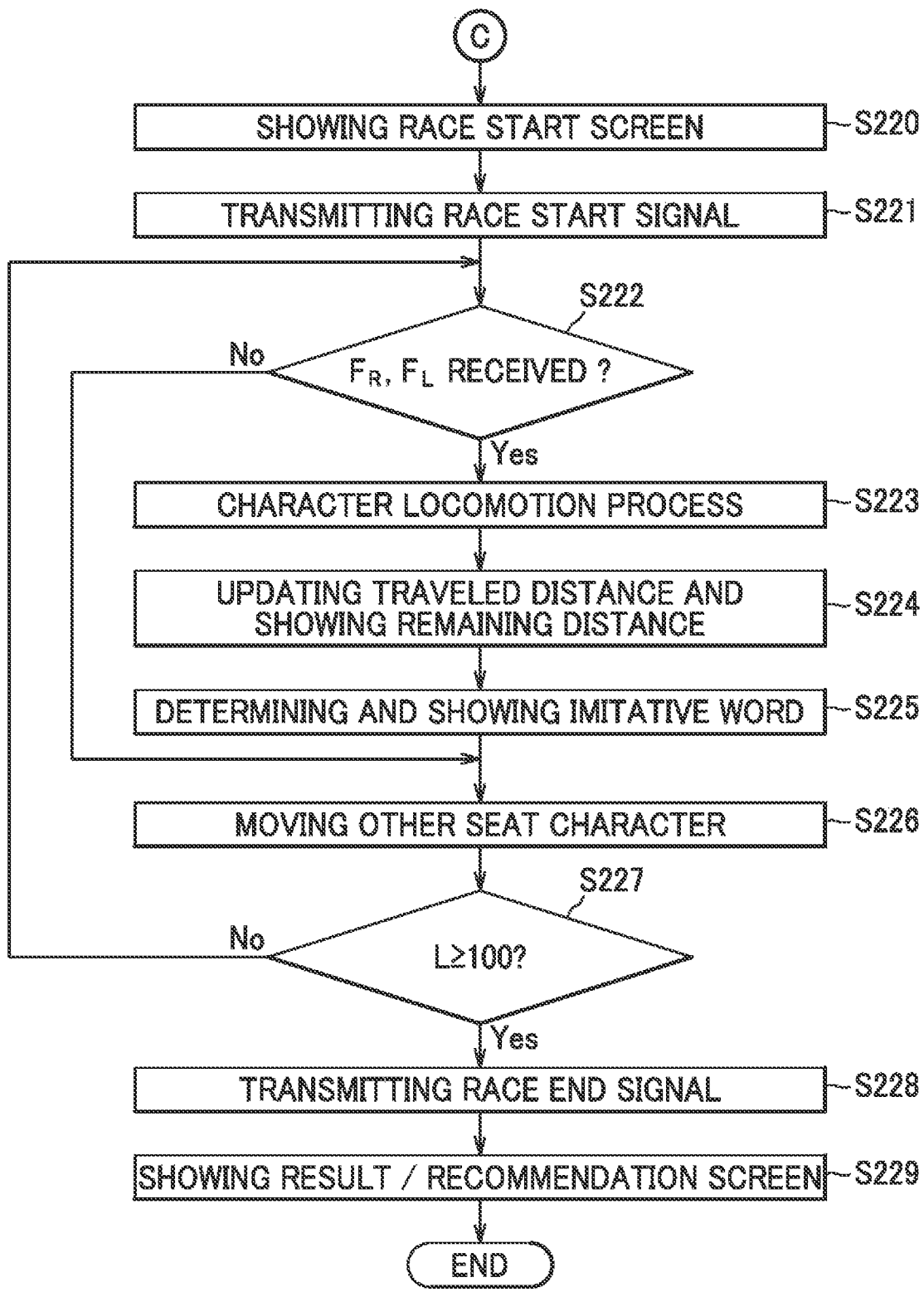
FIG. 15 is a subset of steps for processing a race in the game proceeding process.
Figure 18:
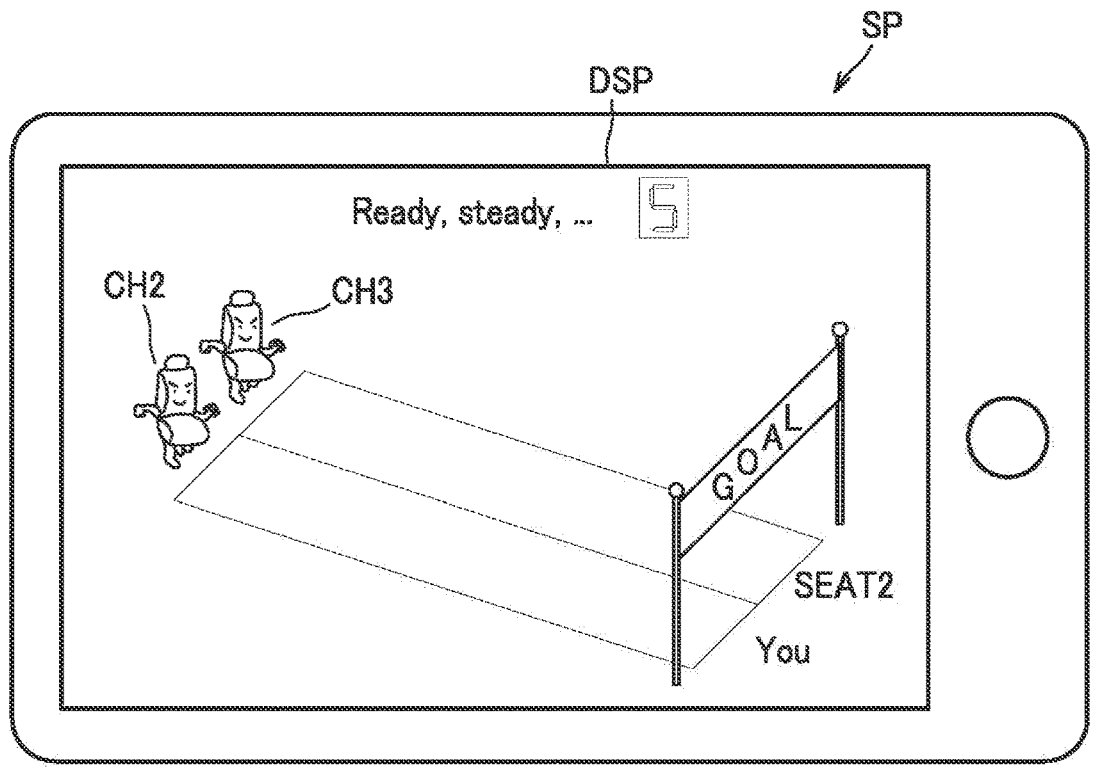
FIG. 18 is an example of a start screen for a 100-meter dash game.

If the calibration comes to an end, the game processing unit 210 then shows a race start screen as shown in FIG. 15 (S220). The race start screen displays, for example, as shown in FIG. 18, a text message "Ready, steady . . . " and a numeric character indicative of a countdown for the start. In the race screen, the 100-meter race tracks, and seat-personified characters CH2, CH3 on the respective tracks are also displayed.

For example, if a plurality of tracks are shown and there is an entry of another occupant P competing in the same race, then text labels indicating players, i.e., "You" and "SEAT 2" of which the latter is a label of an entrant seated on another seat, are shown on the respective tracks.

With the race start screen being shown on display, when the race starts after completion of the countdown (relevant steps omitted from the flowchart), the game processing unit 210 transmits a race start signal to the control unit 100 (S221). Subsequently, the character locomotion processing section 213 makes a determination as to whether or not the step intensities $F_R$, $F_L$ have been received (S222). If received (Yes, S222), then the character locomotion processing section 213 executes a process of moving a character CH2 according to the magnitudes of the step intensities $F_R$, $F_L$ (S223). The traveled distances L are updated, and the traveled distances L are transmitted to the control unit 100. Further, the character locomotion processing section 213 shows a remaining distance on the display DSP (S224).

Figure 19:
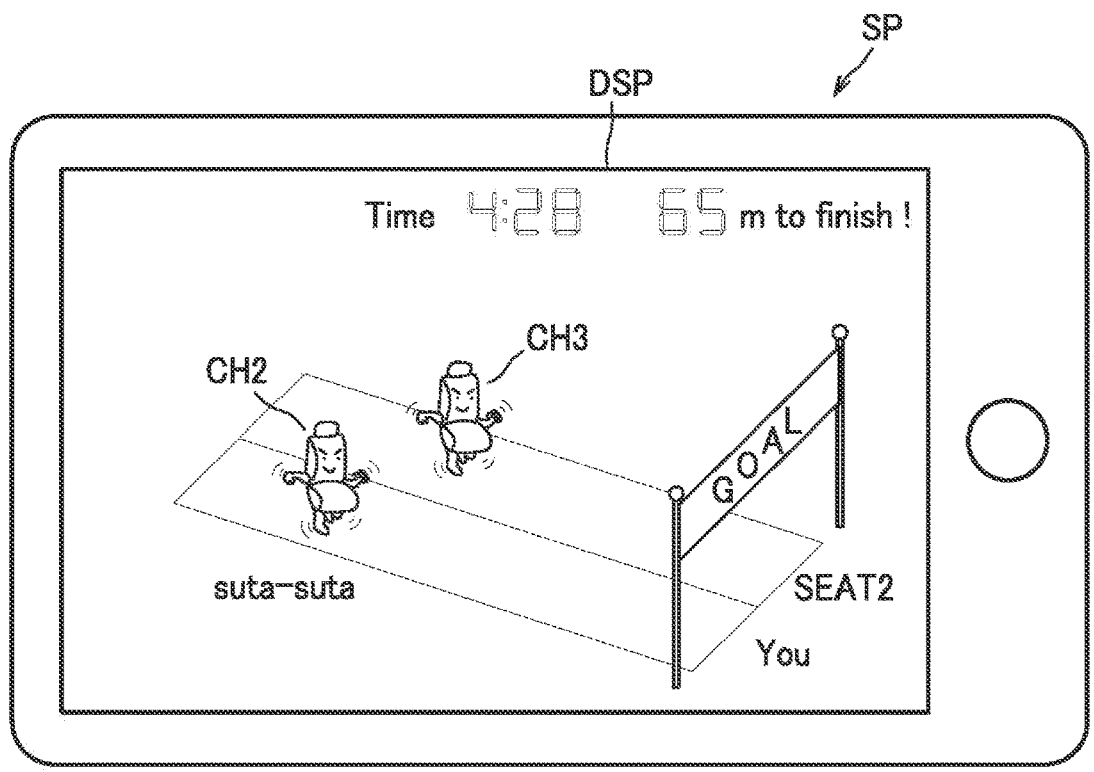
FIG. 19 is an example of a screen shown during the 100-meter dash game.

Next, the imitative word determination section 214 determines an imitative word to be shown, from the step cycle TS and the normal step cycle $TS_n$, and shows the same on the display DSP (S225). Accordingly, during the race, an animated cartoon of characters CH2, CH3 running on the respective tracks, the remaining distance, and an imitative word such as "suta-suta (walking at brisk pace)" are displayed, as shown in FIG. 19. Moreover, the game processing unit 210 shows a time lapsed after the start.

If the step intensities $F_R$, $F_L$ have not been received (No, S222), then the character locomotion processing section 213 proceeds to step S226 without executing steps S223 to S225.

Subsequently, the game processing unit 210 acquires a traveled distance L of the character CH3 for the other seat occupant P from the control unit 100, and moves the other seat character CH3, on an as-needed basis (S226).

Figure 20:
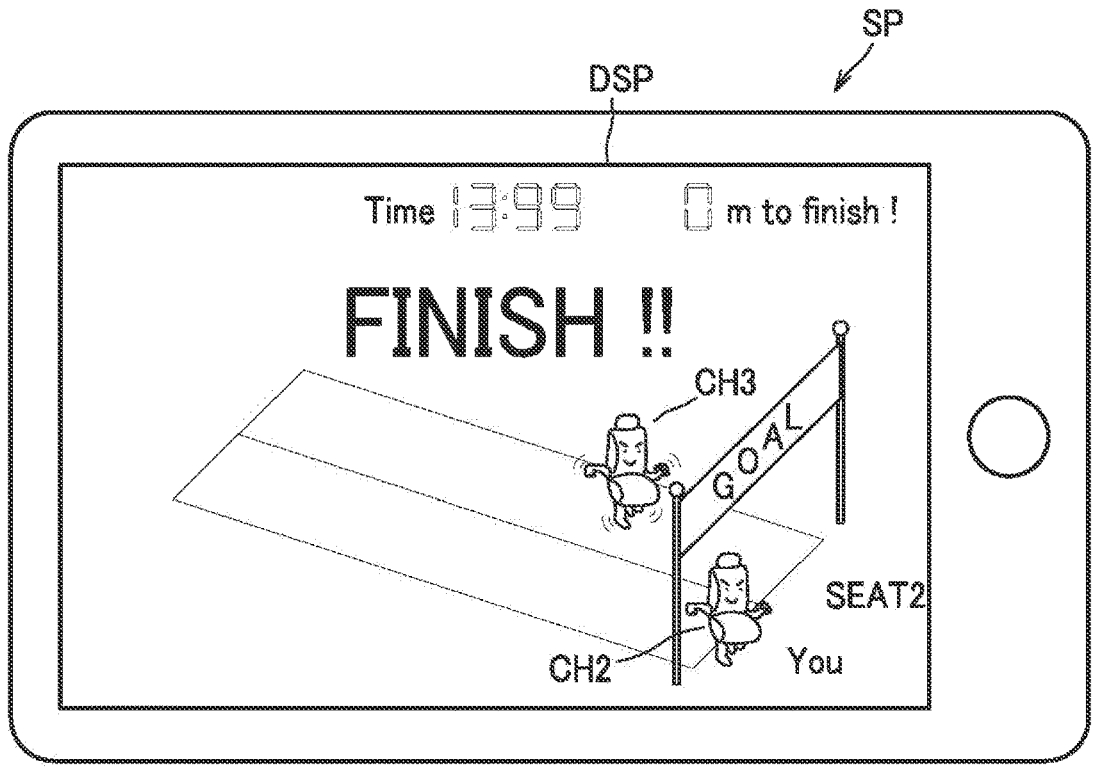
FIG. 20 is an example of a screen shown at the time of finishing in the 100-meter dash game.

Next, the character locomotion processing section 213 makes a determination as to whether or not the traveled distance L is equal to or greater than 100 (S227), and if not equal to or greater than 100, then repeats the process of the race starting from step S222. On the other hand, if the traveled distance L becomes equal to or greater than 100 (Yes, S227), then a race end signal is transmitted to the control unit 100 (S228). At the end of the race, a screen for example as shown in FIG. 20 is displayed. In this screen, the remaining distance is shown to be zero meters, and a time recorded at the finish of the race is indicated.

Figure 21:
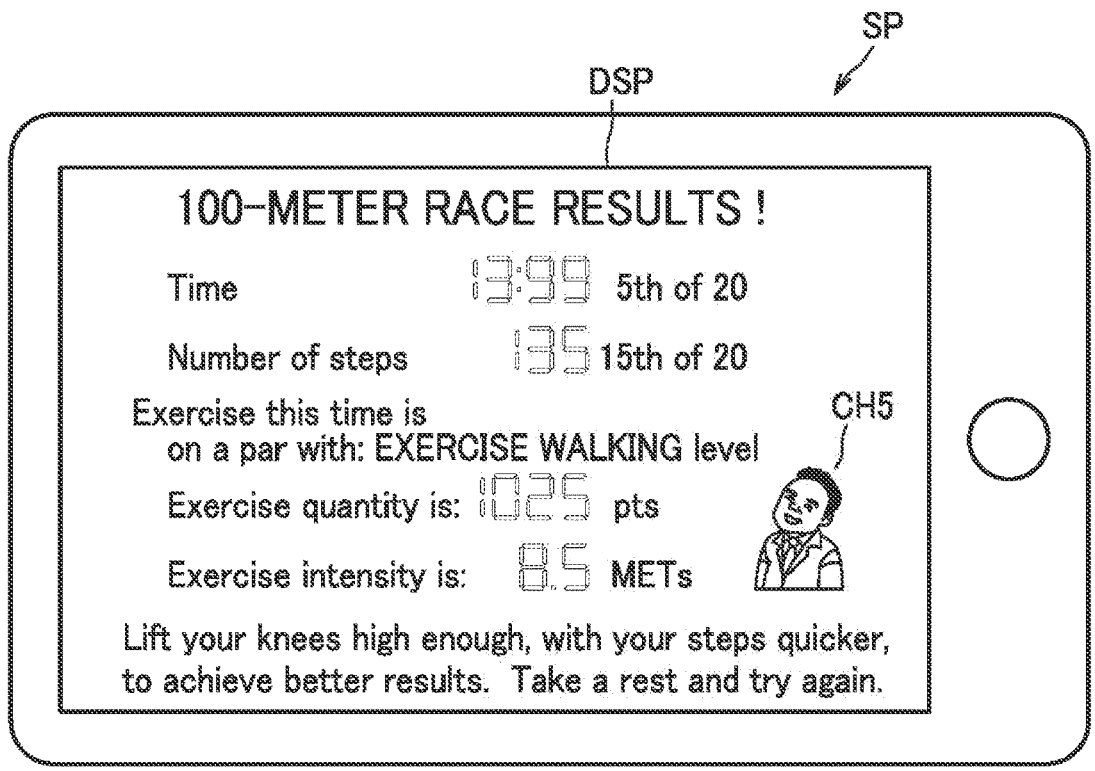
FIG. 21 is an example of a result screen of the 100-meter dash game.

Then, the result output section 219 determines, as a result of the exercise, an exercise level, a quantity of exercise, an exercise intensity, and a recommendation, and shows them on the display DSP (S229). The result screen is, for example, a screen as shown in FIG. 21. In the result screen, the ranking determined among all the past players as from data accumulated up to then in the control unit 100 may be shown. Further, if the result is good, a character CH5 with pleased facial expressions may be shown, while if the result is not good, a character with regrettable facial expressions may be shown.

After the result output section 219 displays the result of exercise, the process of app comes to an end.

As has been described above, with the vehicle seat S according to the present embodiment, the following advantageous effects can be achieved.

The occupant P can visually recognize the location of the coating 31 applied to the seat body S0 before getting seated on the seat body S0, and thus can easily check the location of each of the pressure sensors PS1 to PS6. Therefore, the occupant can properly set their left and right thighs on the left and right pressure sensors PS3, and thus can enjoy playing the game by making use of the pressure sensors S3 effectively.

Since the coating 31 as a location marker is exposed to view from outside the outer covering 10, the location marker (coating 31) can be visually recognized more easily as compared, for example, with an alternative embodiment in which a location marker hidden beneath the outer covering 10 (spacer 36, see FIG. 31) as will be described later is adopted.

Since the coating 31 is configured to have a color different from a color of the outer covering 10, the location marker (coating 31) can be made more easily recognizable.

Since the controller 100 outputs, to the smart phone SP, the pressure values acquired from the pressure sensors PS1 to PS6 as operation signals for operating the game app of the smartphone SP, the occupant P seated on the vehicle seat S can operate the smartphone SP by moving his/her legs and/or shoulders, on the seat body S0.

Therefore, the operation of the smartphone SP which would conventionally require manipulation performed by hand can be carried out through motions of his/her body on the seat body S0. Accordingly, one who becomes tired in a vehicle can move his/her body in moderation to feel refreshed.

During a period from a time at which the control unit 100 receives a race start signal from the smartphone SP till a time at which the control unit 100 receives a race end signal from the smartphone SP, the door light 42A comes and stays on or blinks on and off and the electronic message board 12 displays that the 100-meter dash game app is in use, as shown in FIGS. 2 (*a*) and (*b*). Accordingly, it is possible to notify any other person(s) outside the car CR that the app for the 100-meter dash game is in use. In other words, the occupant P can share with the others outside the car CR the status that the app for the 100-meter dash game is in use. In particular, by virtue of the electronic message board 12, the information that the app for the 100-meter dash game is in use can be shown so clearly that anyone outside can readily become aware thereof.

Through these activities of notification, people who see these showings from outside the car CR may be motivated to make an entry for the game, and thus made willing to exploit the features of the vehicle seat S.

Since the pressure sensors PS1 to PS6 are capable of detecting the states of the seat surfaces S21, S22 facing an occupant P seated, the occupant P can easily access the pressure sensors PS1 to PS6. In other words, the occupant can operate the target device by changing the states of the seat surfaces, and thus can operate the smartphone SP with increased ease.

Since the affirmative-reply signal and the negative-reply signal are generated on condition that the pressure values P6 exceed the threshold value P6*th*, and the step intensity F as well is outputted on condition that the pressure value P3 has crossed the threshold value P3*th* from above to below, an inadvertent operation of the smartphone SP that is counter to the intent of the occupant P can be restrained.

Since the affirmative-reply signal is generated based on the measurement value of the right pressure sensor PS6, and the negative-reply signal is generated based on the measurement value of the left pressure sensor PS6, an operation error can be restrained.

Although one exemplified embodiment of the present invention has been described above, the present invention is not limited to the above-described embodiment. Specific configurations may be modified where appropriate without departing from the gist of the present invention.

For example, in the above-described embodiment, the present invention is applied to the operation of the 100-meter dash game as an example of a game, but may also be applied to the operation of other games. Moreover, the target device which is to be operated may not be limited to the smartphone, but may be a PC, a tablet PC, a navigation system or the like. Furthermore, the device is not limited to one having a display as those enumerated above, but may be a telephone, an audio system, or the like. It is to be understood that the target device in the context of the present invention is not intended to encompass a vehicle itself (i.e., the driving operation of a vehicle is not a target). However, as long as the operation is not directed to driving of a vehicle, the target device may be provided as stationary equipment fixed to a vehicle, and the operation may be any one, such as to be performed on an air conditioner, or to actuate a window pane to move up and down.

Since the operation of the target device which can be performed by a body motion on a vehicle seat is realized as described above, any person unwilling to use a hand, or even a person physically challenged and thus unable to use a hand, can operate a target device by moving part of his/her body, or tensing his/her muscle or otherwise.

Although the above-described embodiment is configured such that the notification signal is outputted during a period from a time of receipt of a race start signal till a time of receipt of a race end signal, the notification signal may be outputted in any other period. For example, the notification signal may be outputted during the whole period which starts from launch of a predetermined app of a smartphone SP and continues while communication with the control unit 100 is enabled.

Although the above-described embodiment is configured such that the notification device is located within the vehicle, the notification device may be provided on an exterior surface of the vehicle.

Figure 22:
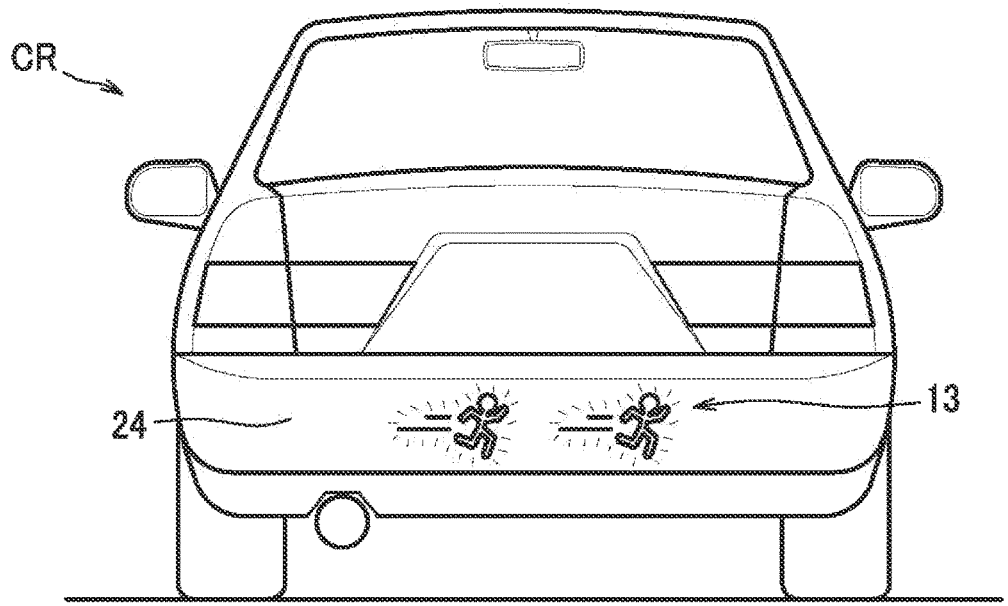
FIG. 22 is a rear view of a car for illustrating another example of the notification device.

For example, a lighting part 13, as of a car CR shown in FIG. 22, with luminous figures of running persons shining therein may be provided at a rear bumper 24 as a notification device.

Figure 23:
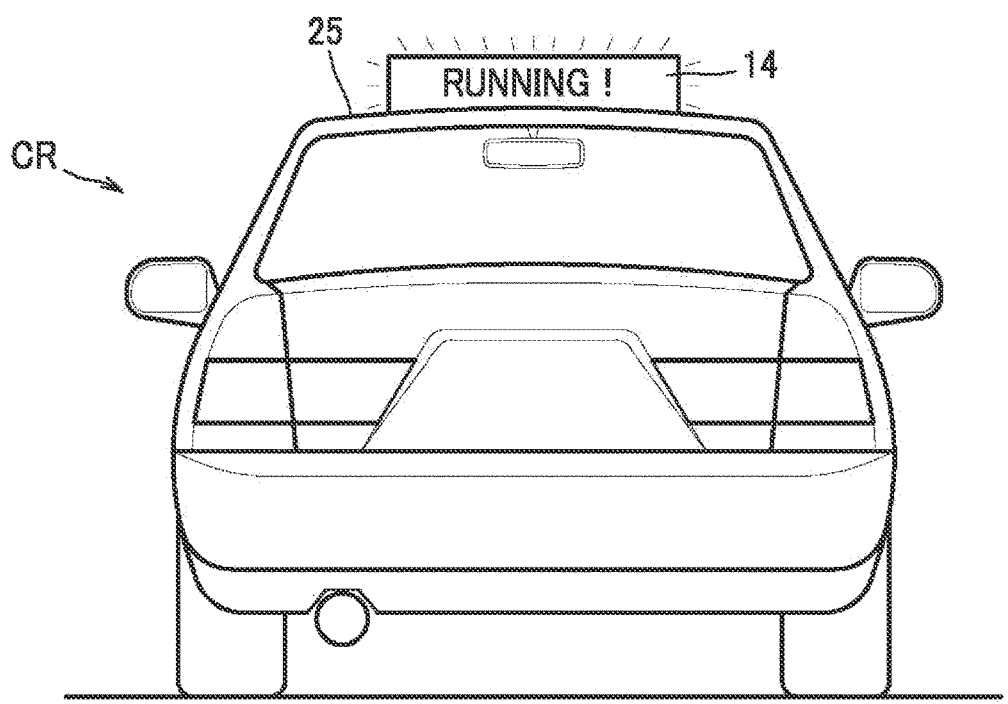
FIG. 23 is a rear view of a car for illustrating another example of the notification device.

Alternatively, a notification device may be an indicator light 14, as of a car CR shown in FIG. 23 installed on top of a roof 25 of the car CR. In the indicator light 14, for example, a text "RUNNING !" may be displayed.

Such a lighting part 13 may be caused to stay on or blink on and off, so that an effective notification that the target device is in use can be given to anyone outside the car CR. Particularly, when the indicator light 14 is adopted, a notification that the target device is in use can be given to anyone outside the car CR in an easy-to-recognize manner.

Although not illustrated in the drawings, the notification device may be a lighting part or the like provided on the seat body S0 itself of the car seat S. Provision of the notification device on the seat body S0 or any other location inside the car CR makes it possible to notify any fellow passenger(s) of the use of the target device. In addition, if such a lighting part inside the car CR is located in such a position as to be recognizable from outside the car CR, anyone outside the car CR can also be notified of the use of the target device.

Furthermore, the notification device may be an information sharing server connected to terminals of a plurality of users via a network and configured to transmit received information to the terminals so that the information is shared among the plurality of users.

Figure 24:
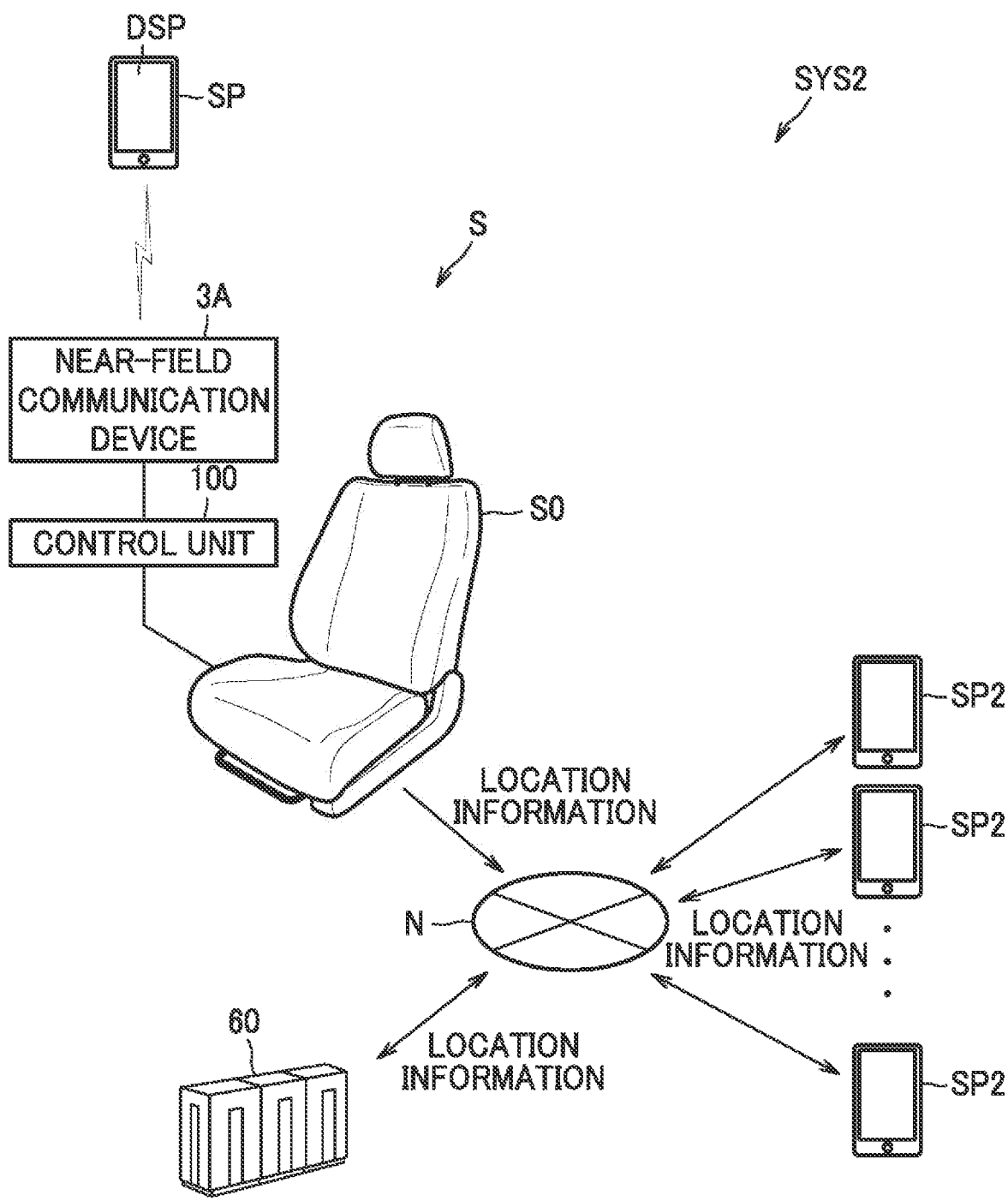
FIG. 24 is a diagram for explaining a system configuration for an embodiment in which the notification device is an information sharing server.

A description will be given of a system according to this embodiment with reference to FIG. 24 and FIG. 25.

The system SYS2 comprises a vehicle seat S having the same or similar functionalities as those of the above-described embodiment, and an information sharing server 60.

The vehicle seat S and the information sharing server 60 are connected via the Internet N as an example of a network in a manner that permits them to communicate with each other.

The control unit 100 of the vehicle seat S is configured to be capable of acquiring location information from a smartphone SP. Moreover, the control unit 100 is configured such that when a notification signal is to be outputted to the information sharing server 60, the control unit 100 outputs the notification signal with the location information included therein.

The information sharing server 60 is configured to allow a plurality of other smartphones SP2 in which a dedicated SNS (social networking service) app is installed to connect to the information sharing server 60. The information sharing server 60 responds to a request from an SNS app or determines that a predetermined condition is satisfied, and transmits, to the smartphones SP2, information transmitted from the smartphone SP (herein, refers particularly to notification information containing location information), so that information can be shared among a plurality of users.

Figure 25:
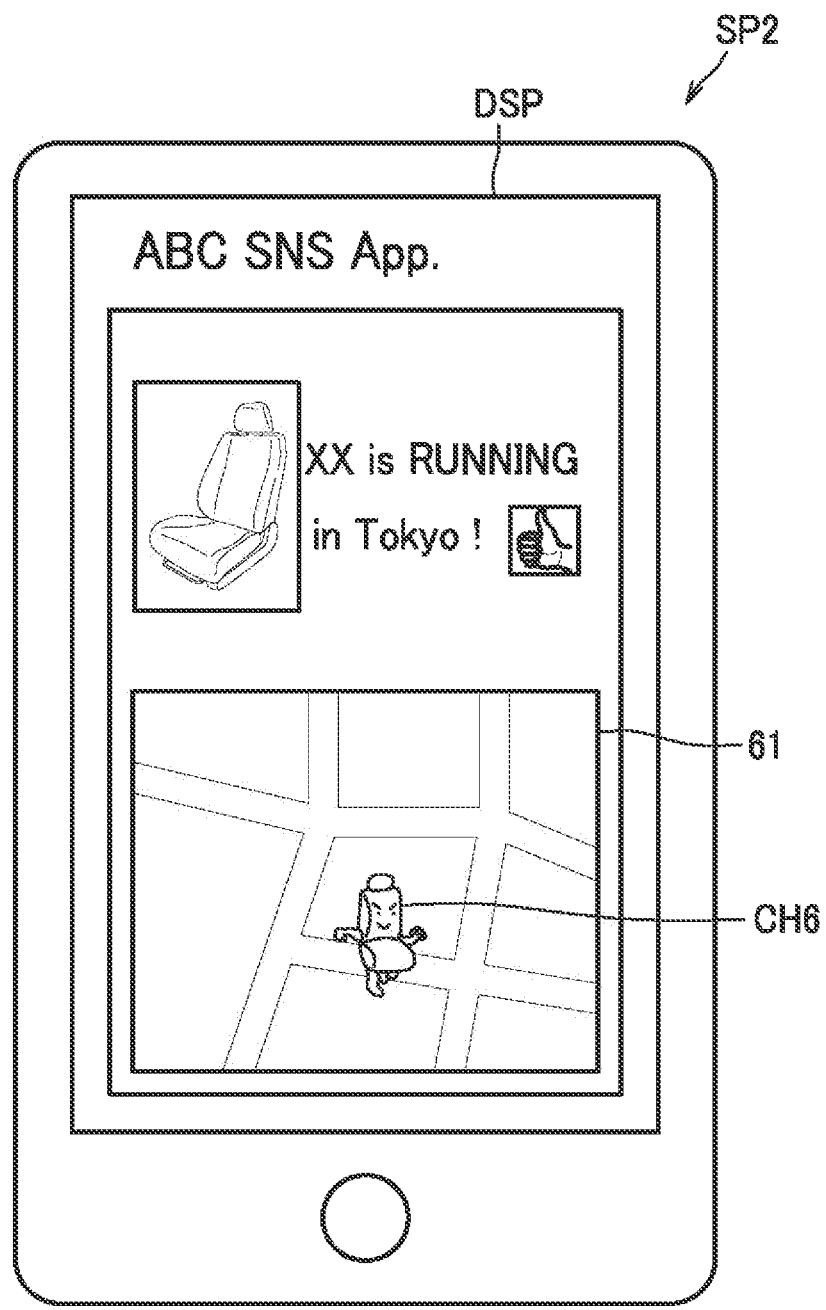
FIG. 25 is an example of a screen of a smartphone of an SNS user.

Upon receipt of the notification information, the app of the smartphone SP2 executes the process steps which include: showing a map 61 on the display DSP; and showing, on the map 61, a seat-personified character CH6 in a position corresponding to the location information included in the received notification information, as shown in FIG. 25. The app further executes the process steps which include: identifying a city name from the location information; and showing, on the display DSP, information the contents of which indicate that the target device is in use, such as "XX is RUNNING in Tokyo (city name)". In order to identify a city name from the location information, a database that contains information on ranges of location and city names associated therewith may be stored in the information sharing server 60, and a search for a city name may be made by such location information.

By this system SYS2, several people are notified that the target device is in use, via the Internet N, so that information that the target device is in use can be shared among several people with a sense of reality.

In this embodiment, the map to be shown may be a map on the navigation system rather than on the smartphone SP2. Moreover, the location information may not necessarily be acquired from the smartphones SP2. For example, the seat body S0 may comprise a GPS (global positioning system) which acquires location information.

Figure 26:
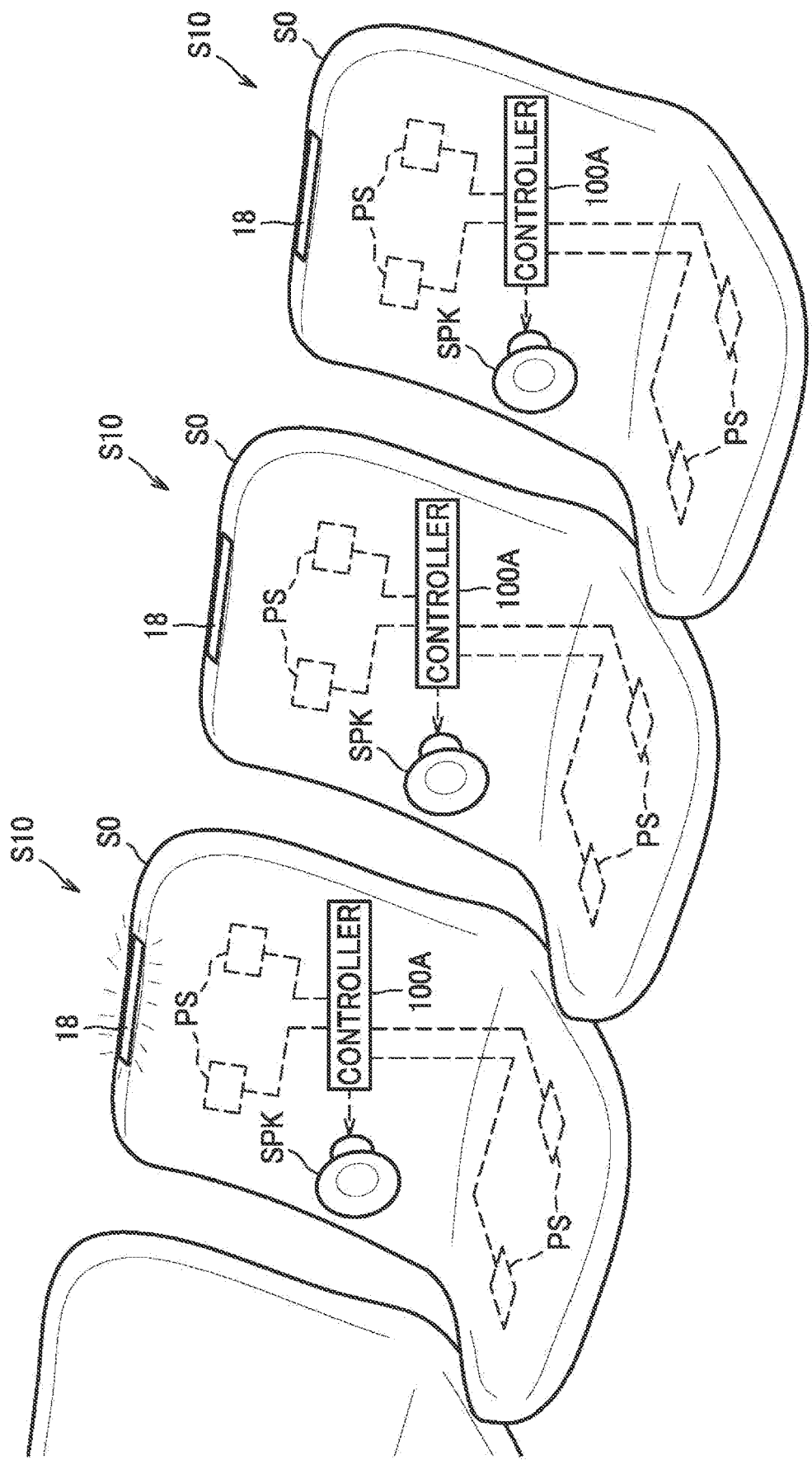
FIG. 26 is a diagram for explaining an embodiment in which the present invention is applied to a seat for a stadium or an arena.

The seat may not necessarily be installed in a vehicle. For example, application in a seat installed in a stadium or an arena may be feasible. One example of this embodiment will now be discussed with reference to FIG. 26.

The seat S10 comprises a seat body S0 and several components provided therein which includes a plurality of pressure sensors PS, a controller 100A, a speaker as an example of a target device, and a lighting member 18 as an example of a notification device. For example, two of the pressure sensors PS are arranged left and right in the seat back and two of the pressure sensors PS are arranged left and right in the seat cushion. The pressure sensors PS are connected to the controller 100A.

The controller 100A is configured to execute the process steps which comprise: acquiring a pressure value from each pressure sensor PS, and causing the speaker SPK to give forth a sound with a tone color selected (e.g., among musical instruments of various kinds, such as a bugle, a drum or the like) according to the position of each pressure sensor PS and a volume level selected according to the magnitude of the pressure value acquired from the pressure sensor PS. The controller 100A is also configured to execute a process step of providing the lighting member 18 with electric power (signal) for causing the lighting member 18 to emit light simultaneously with the process step of causing the speaker SPK to produce a sound. Accordingly, the controller 100A outputs a notification signal to the lighting member 18 as a notification device, when communication with the speaker SPK as a target device is available. The electric power for causing the lighting member 18 to emit light may preferably have an output corresponding to the magnitude of the pressure value acquired from the pressure sensor PS.

With this seat S10 configured as described above, for example, when a baseball game is played in a stadium, an occupant seated on the seat S10 can cause the speaker SPK to emit a sound for expressing support and encouragement by applying a pressure to the pressure sensors PS of the seat S10. Once any one uses this seat S10 and makes a sound, the lighting member 18 indicates that the speaker SPK of the seat S10 is in use, and other spectators may feel eager to do it in the same way. Accordingly, support and encouragement expressed by sound emission can be caused to gradually spread in the stadium, to thereby intensify the cheering.

Although the coating 31 is taken as an example of the mode of marking the location of sensors in the above-described embodiment, means for marking the location of sensors is not limited to coating. Other embodiments for marking the location of sensors will be described below.

Figure 27:
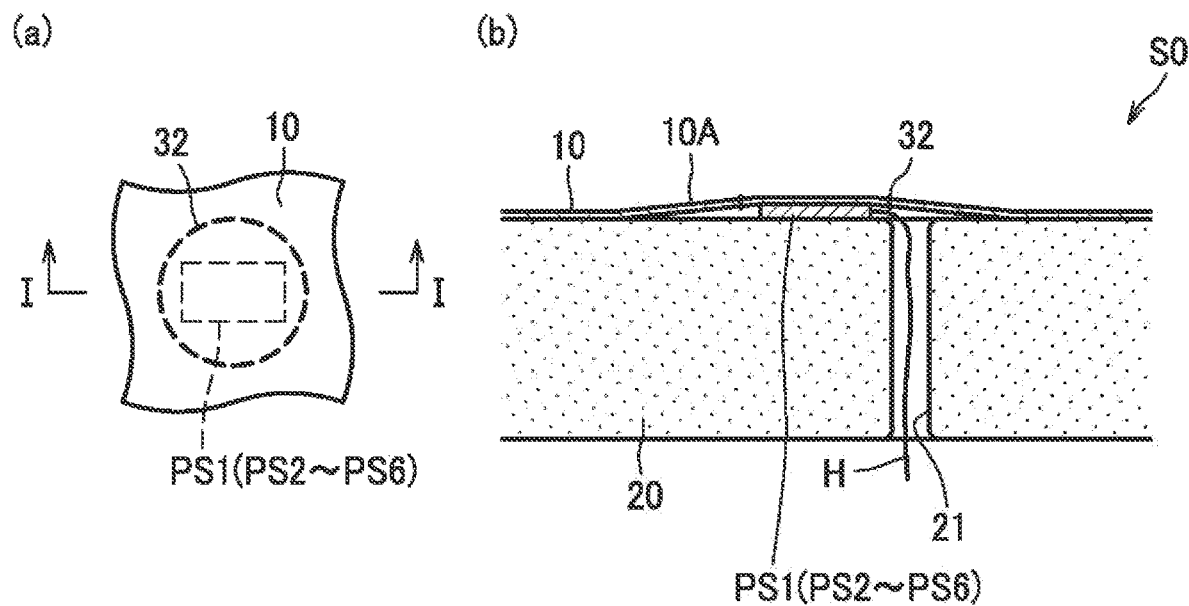
FIG. 27 includes (a) a plan view showing a location marker configured according to a first modified example, and (b) a view of section I-I of FIG. 27(a).

In FIG. 27 showing a first modified example, a string member 32 sewn in the outer covering 10 is illustrated as an example of a location marker. The string member 32 may be a string of fiber such as cotton, wool, silk, nylon, etc., or may be a strap of leather.

The string member 32 is sewn in the outer covering 10, and thus is partly exposed to view from outside the outer covering 10 as a pattern drawn thereon. The pattern formed by the string member 32 is located in a position corresponding to each of the pressure sensors PS1 to PS6. The pattern may be any pattern; for example, as shown in FIG. 27 (*a*), a circular pattern surrounding the pressure sensor PS1 may be adopted.

The string member 32 may have a color different from a color of the outer covering 10. With the first modified example configured as described above, the same advantageous effects as in the above described embodiment can be achieved.

Figure 28:
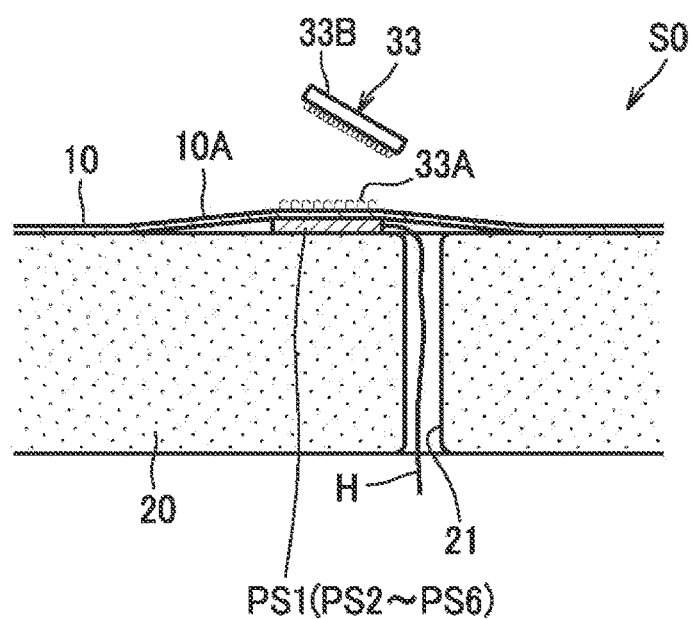
FIG. 28 is a section view of a location marker configured according to a second modified example.

In FIG. 28 showing a second modified example, a hook and loop fastener 33 is illustrated as an example of a location marker. The hook and loop fastener 33 comprises a first member 33A provided on the outer covering 10 and a second member 33B capable of being attached to and detached from the first member 33A. The first member 33A is located in a position corresponding to each of the pressure sensors PS1 to PS6 on the outer covering 10. It is to be understood that the first member 33A may be formed integrally with the outer covering or may be fixed to the outer covering 10 by adhesive or the like.

The first member 33A comprises a hook portion with hook-shaped naps raised thereon. The second member 33B comprises a loop portion with loop-shaped naps raised thereon. The loop portion of the second member 33B can be put on and taken off the hook portion of the first member 33A. The opposite of this modified example may be feasible, that is, the hook portion may be provided in the second member 33B and the loop portion may be provided in the first member 33A. This alternative configuration may be preferable because when the second member 33B has been detached from the first member 33A, a loop portion of the first member 33A is unlikely to hitch on occupant's clothes.

The first member 33A with the second member 33B detached therefrom is exposed to view from outside the outer covering 10. The second member 33B attached to the first member 33A is exposed to view from outside the outer covering 10.

The surface of the second member 33B exposed to view from outside has a color different from a color of the outer covering 10. The first member 33A may have any color, e.g., a color belonging to the same group in the color system as that to which the color of the outer covering 10 belongs; for example, the same color as that of the outer covering 10 may be adopted. In this configuration, when an occupant uses the seat body S0 as a game controller, the second members 33B may be attached to the first members 33A thereon, so that the location of each of the pressure sensors PS1 to PS6 can be made conspicuous by virtue of the second member 33B different in color from the outer covering 10. Also, when the occupant does not use the seat body S0 as the game controller, the second member 33B may be removed, so that the external appearance of the seat body S0 can be improved. Other advantageous effects expected to be achieved by this modified example comprises those mentioned for the embodiment described above.

The other feasible examples of the member capable of being attached to and detached from the outer covering 10 include, for example, a snap fastener having a protruding metal part and a recessed metal part.

Figure 29:
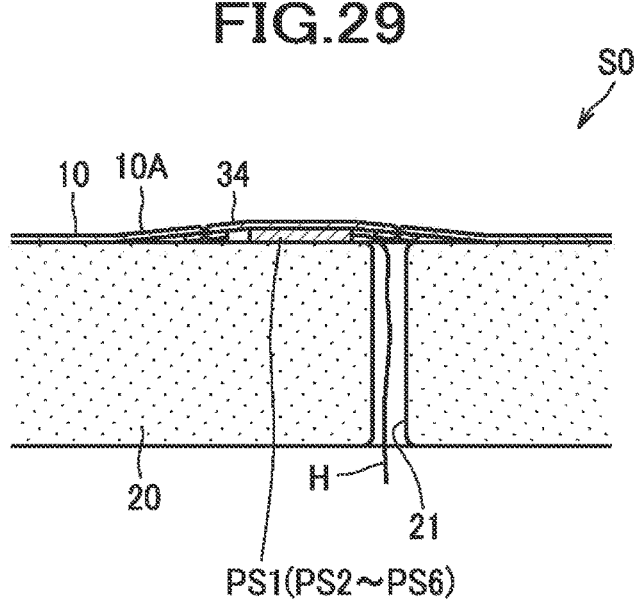
FIG. 29 is a section view of a location marker configured according to a third modified example.

In FIG. 29 showing a third modified example, a marker covering 34, provided separately from the outer covering 10 which covers the major portion of the exterior of the seat body S0, is illustrated as an example of a location marker. In this modified example, the marker covering 34 is integrally sewn in the outer covering 10 in a position corresponding to each of the pressure sensors PS1 to PS6.

The marker covering 34 is made of a material different from a material, or with a color different from a color, of the outer covering 10. The marker covering 34 is exposed to view from outside the outer covering 10. With the third modified example configured as described above, as well, the same advantageous effects as in the above-described embodiment can be achieved.

Figure 30:
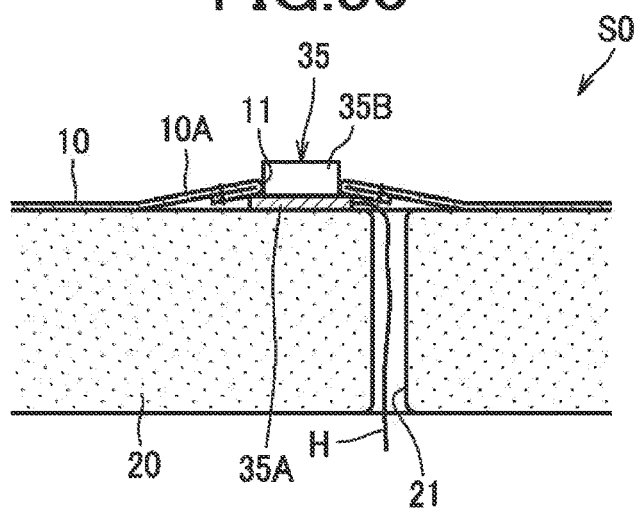
FIG. 30 is a section view of a location marker configured according to a fourth modified example.

In FIG. 30 showing a fourth modified example, a push-button switch 35 is illustrated as an example of a sensor and a location marker. In this modified example, an opening 11 is formed in the outer covering 10 in a position corresponding to each of the pressure sensors PS1 to PS6. The hem around the opening 11 is doubled inward and stitched together.

The switch 35 comprises a base 35A and a push button 35B. The base 35A accommodates a circuit board, etc. implementing a switching function. Wiring H connected to the circuit board and other elements is installed through the hole 21 of the cushion pad 20, and is connected to the control unit 100, as in the above-described embodiment.

The base 35A is disposed between the outer covering 10 and the cushion pad 20. The push button 35B protrudes from the base 35A through the opening 11 to the outside of the outer covering 10, and is exposed to view from outside. The push button 35B has a color different from a color of the outer covering 10.

In this modified example, the switch 35 configured as a sensor also serves as a location marker; therefore, the cost can be reduced, for example, in comparison with an alternative configuration in which a member other than the sensor is provided as a location marker. Other advantageous effects expected to be achieved by this modified example comprises those mentioned for the embodiment described above.

It is to be understood that in an embodiment in which an opening 11 is formed in the outer covering 10 as illustrated in this modified example, a pressure sensor PS1 may be provided to be exposed to view from outside through the opening 11. Alternatively, another member may be provided on the pressure sensor PS1 and exposed to view from outside through the opening 11. To offer another alternative of these modified examples in which the sensor is utilized as a location marker, for example, the sensor may be attached to an outer surface of the outer covering, so that the sensor serves as a location marker.

Figure 31:
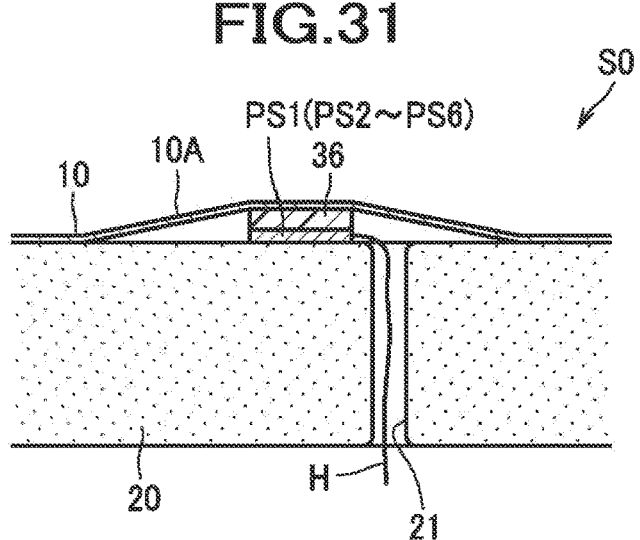
FIG. 31 is a section view of a location marker configured according to a fifth modified example.

In FIG. 31 showing a fifth modified example, a spacer 36 disposed between the outer covering 10 and the pressure sensor PS1 is illustrated as an example of a location marker. The spacer 36 is, for example, made of plastic, and makes a part of the outer covering 10 configured to protrude outward relative to other parts surrounding that part. Herein, the amount of protrusion of the part of the outer covering 10 is large enough, i.e., so large that an occupant can visually recognize the protrusion. With this configuration, as well, the same advantageous effects as in the above-described embodiment can be achieved.

Figure 32:
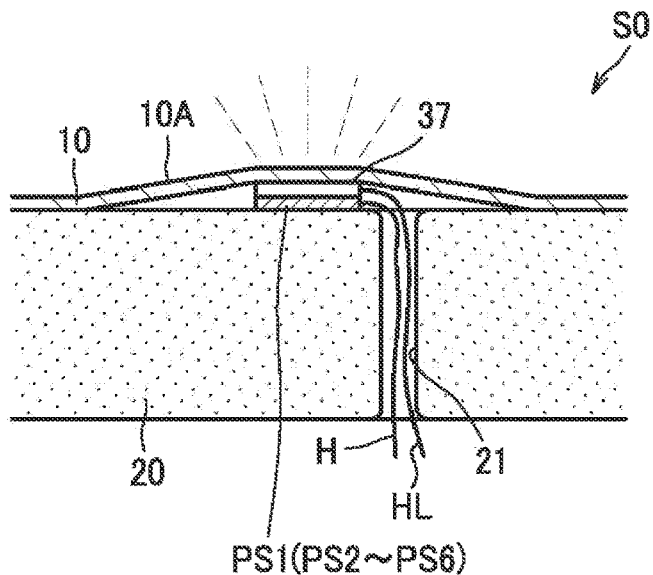
FIG. 32 is a section view of a location marker configured according to a sixth modified example.

In FIG. 32 showing a sixth modified example, a sheet-type illuminant 37 as an example of a luminous member is illustrated as an example of a location marker. The sheet-type illuminant 37 is a member which emits light toward outside of the outer covering 10, and is configured to give off light by passage of electric current therethrough. The sheet-type illuminant 37 is disposed between the outer covering 10 and the pressure sensor PS1. Wiring HL for the sheet-like illuminant 37 is installed through a hole 21 of the cushion pad 20, and is connected to the control unit 100.

The sheet-type illuminant 37 may comprise, for example, an organic electroluminescent lighting panel. The outer covering 10 is formed of a material allowing light to pass therethrough, for example, of a material with a meshy texture. The outer covering 10 may alternatively be provided with pores, through which light emitted from the sheet-type illuminant 37 is allowed to pass to the outside.

Figure 33:
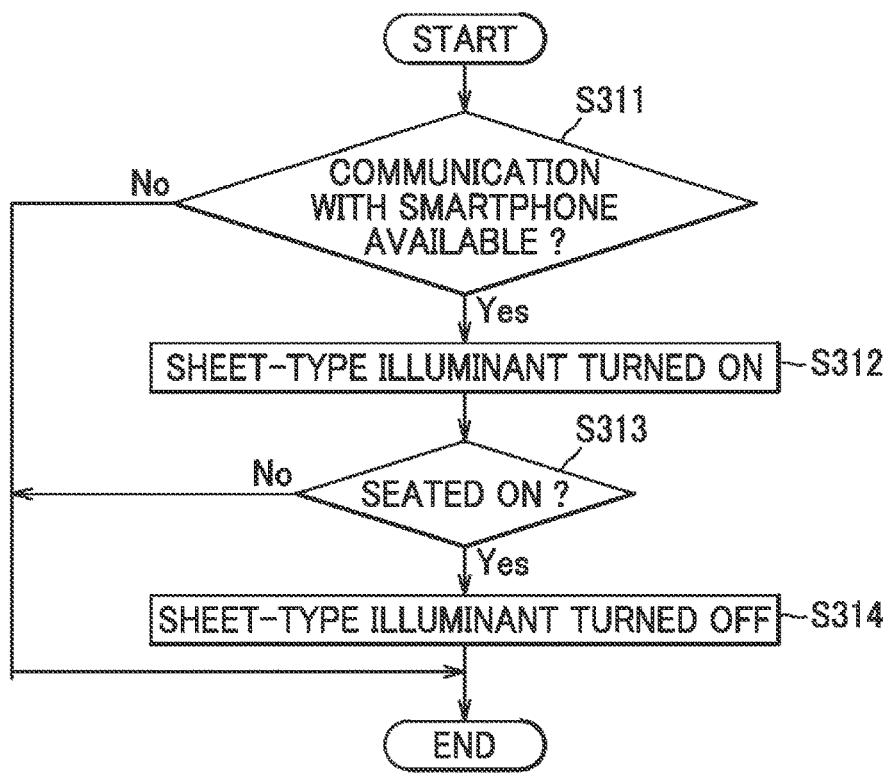
FIG. 33 is a flowchart showing an operation of a control unit according to the sixth modified example.

In this modification, the control unit 100 executes a control process shown in FIG. 33. The control unit 33 repeatedly exercises control as shown in FIG. 33 at all times.

In the control as shown in FIG. 33, the control unit 100, first, makes a determination as to whether or not communication with a smartphone SP is available (S311). If it is determined in step S311 that the communication is unavailable (No), the control unit 100 then brings this control to an end.

If it is determined in step S311 that the communication is available (Yes), the control unit 100 then energizes the sheet-type illuminant 37, and causes the sheet-type illuminant 37 to emit light (S312). After step S312, the control unit 100 makes a determination based upon information from each of the pressure sensors PS1 to PS6 as to whether or not an occupant has got seated on the seat body S0 (S313).

If it is determined in step S313 that an occupant has not got seated (No), the control unit 100 then brings this control to an end. If it is determined in step S313 that an occupant has been seated (Yes), the control unit 100 then stops energizing the sheet-type illuminant 37, causes the sheet-type illuminant 37 to turn off (S314), and brings this control to an end.

With this modified example, as described above, the same or similar advantageous effects as expected in the above-described embodiment can be achieved; besides, the following further advantageous effects can be achieved.

Since the sheet-type illuminants 37 are caused to emit light when the control unit 100 is able to communicate with a smartphone SP, that is, when an occupant is about to use the pressure sensors PS1 to PS6, an unnecessary emission of light by the sheet-type illuminants 37 when the pressure sensors are not in use can be restrained. In this way, when the pressure sensors are not used, the sheet-type illuminants 37 do not give off light, so that the seat body S0 can be improved in its appearance.

Since the sheet-type illuminants 37 are caused to turn off after an occupant has got seated on the seat body S0, the power consumption can be reduced in comparison, for example, with an alternative configuration in which sheet-type illuminants 37 are caused to give off light continuously even after an occupant has got seated.

The luminous member is not limited to the sheet-type illuminant 37, but may be an LED, or the like, for example. If non-sheet-type luminous member such as an LED is used, it may be embedded around the sensor in the cushion pad. Another configuration may be feasible such that the sheet-type luminous member is attached to an outer surface of the outer covering.

Figure 34:
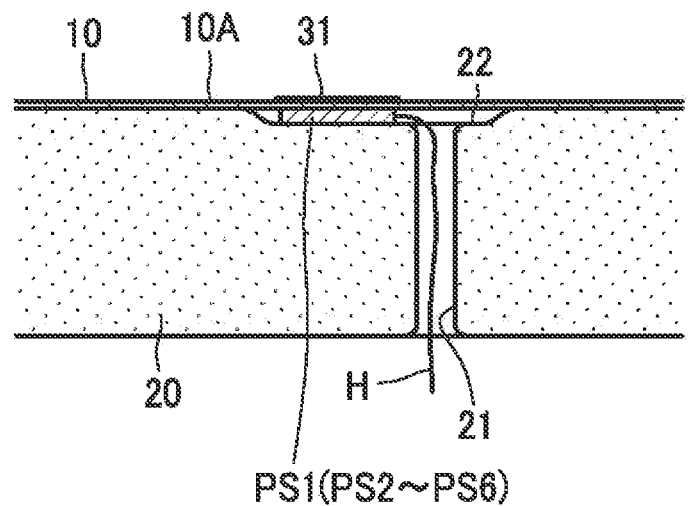
FIG. 34 is a section view of a location marker configured according to a seventh modified example.

Although the above-described embodiment is configured such that the part of the outer covering 10 under which the pressure sensor PS1 to PS6 is disposed is configured to protrude outward, the present invention is not limited to this configuration. For example, as in a seventh modified example shown in FIG. 34, the cushion pad 20 may have a recess 22 provided therein which has a depth equivalent to a thickness of the pressure sensor PS1 to PS6, so that an outer surface 10A of the outer covering 10 is made flat. In this alternative configuration as well, the location marker such as a coating 31 may be provided on the outer covering 10 in a position corresponding to the pressure sensor PS1 to PS6, so that the same or similar advantageous effects as in the above-described embodiment can be achieved.

Figure 35:
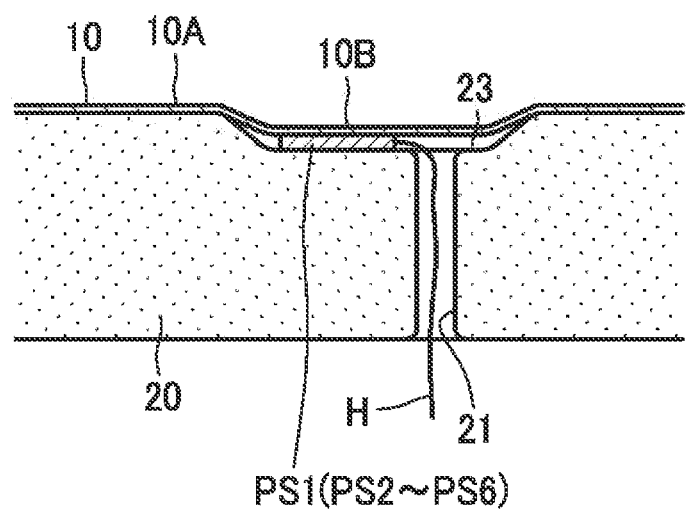
FIG. 35 is a section view of a location marker configured according to an eighth modified example.

As in a eighth modified example shown in FIG. 35, the cushion pad 20 may have a recess 23 provided therein which has a depth greater than a thickness of the pressure sensor PS1 to PS6, so that a region of the outer covering 10 corresponding to the pressure sensor PS1 to PS6 is recessed. In other words, in this modified example, the outer surface 10A of the outer covering 10 has a recess 10B formed in a position thereof corresponding to the pressure sensor PS1 to PS6. In this modified example, the recess 10B serves as a location marker, and the same or similar advantageous effects as in the above-described embodiment can be achieved.

Furthermore, the present invention can be implemented in other configurations as described below.

Although the above-described embodiment comprises a location marker that marks a location of the sensor to render the location visually recognizable from outside the seat body, the location marker may be omitted if making of notification that a target device is in use is the subject matter of the invention. Namely, the locations of the sensors may not be visually recognizable from outside the seat body.

In the above-described embodiment, the sensors are exemplified by the pressure sensors, but the sensors may be any other kind of sensors, such as capacitance sensors, etc. In cases where the pressure is to be measured, pressure distribution sensors may be used instead.

Information on an occupant may not be limited to information for identifying motion of the occupant, but may be a blood pressure, etc. of the occupant.

In the above-described embodiment, the control unit 100 and part of the smartphone SP together form a controller, but the control unit only may constitute a controller, or the smartphone only may constitute a controller. A computer with communications capabilities, such as a cloud computer, may be provided in another location, and such a cloud computer may constitute a controller in part or in entirety.

The target device may not be limited to a smartphone SP, but may be a tablet terminal, etc., for example.

The operation signal for operating the target device may be electric power in itself for driving a motor.

In the above-described embodiment, the controller and the smartphone are connected by radio communication, but may be connected by wire communication.

In the above-described embodiment, the motion for operating a target device is exemplified by leg up-down motion and shoulder press-against-seat-back motion only, but an alternative configuration may be such that a target device is operated by other motions such as an upper-body twisting, rocking (to-and-fro or left-and-right) or turning motion, or buttocks rocking motion, etc.

In the above-described embodiment, the vehicle seat is exemplified by a seat installed in a car as an automobile, but the vehicle seat may be a seat for a car other than an automobile, such as a railcar, or a seat for a vehicle other than a car, such as a ship, aircraft, or rocket. The seat may also be a seat other than a vehicle, such as a chair with or without legs as used in a room of a house.

Any of the elements explained in relation to the exemplified embodiments and illustrative modified examples disclosed in this description may be implemented in combination as desired.

The invention claimed is:

1. A seat comprising:
 a seat body, comprising:
  a cushion pad, and
  an outer covering with which the cushion pad is covered;
 a sensor, disposed between the cushion pad and the outer covering, the sensor being configured to acquire information about an occupant seated on the seat body; and
 a stitched pattern that marks a location of the sensor to render the location visually recognizable from outside the seat body,
  wherein the stitched pattern is formed by a string member sewn into the outer covering and extends along and in contact with an outer surface of the outer covering.

2. The seat according to claim 1, wherein the stitched pattern forms a closed line surrounding a position corresponding to the sensor when the outer cover is viewed from outside of the seat body.

3. The seat according to claim 1, wherein the string member has a color different from a color of the outer covering.

4. The seat according to claim 1, wherein the string member is a string of fiber or a strap of leather.

5. The seat according to claim 1, further comprising a controller configured to acquire information from the sensor.

6. The seat according to claim 1,
 wherein the seat body comprises a seat cushion and a seat back, and
 wherein the seat cushion and the seat back each comprises the cushion pad and the outer covering.

7. The seat according to claim 1, wherein the stitched pattern is sewn into the outer covering at a position at which the stitched pattern does not contact the sensor.

* * * * *